US012570271B2

(12) United States Patent
Raste et al.

(10) Patent No.: US 12,570,271 B2
(45) Date of Patent: Mar. 10, 2026

(54) MOTION CONTROL IN MOTOR VEHICLES

(71) Applicant: Continental Automotive Technologies GmbH, Hannover (DE)

(72) Inventors: Thomas Raste, Oberursel (DE); Peter Lauer, Karben-Okarben (DE); Timo Schröder, Ginsheim-Gustavsburg (DE)

(73) Assignee: Continental Automotive Technologies GmbH, Frankfurt am Main (DE)

( * ) Notice: Subject to any disclaimer, the term of this patent is extended or adjusted under 35 U.S.C. 154(b) by 444 days.

(21) Appl. No.: 18/041,457

(22) PCT Filed: Aug. 10, 2021

(86) PCT No.: PCT/DE2021/200105
§ 371 (c)(1),
(2) Date: Feb. 13, 2023

(87) PCT Pub. No.: WO2022/033644
PCT Pub. Date: Feb. 17, 2022

(65) Prior Publication Data
US 2023/0311849 A1 Oct. 5, 2023

(30) Foreign Application Priority Data

Aug. 13, 2020 (DE) ..................... 10 2020 210 332.1
Mar. 9, 2021 (DE) ..................... 10 2021 202 273.1

(51) Int. Cl.
B60W 30/02 (2012.01)
B60W 10/08 (2006.01)
(Continued)

(52) U.S. Cl.
CPC ............ B60W 30/02 (2013.01); B60W 10/08 (2013.01); B60W 10/184 (2013.01);
(Continued)

(58) Field of Classification Search
CPC .... B60W 30/02; B60W 10/08; B60W 10/184; B60W 30/182; B60W 50/0097;
(Continued)

(56) References Cited

U.S. PATENT DOCUMENTS 6,526,334 B1 2/2003 Latarnik et al.
8,998,353 B2 * 4/2015 Chen ............... B60W 30/18145
303/3

(Continued)

FOREIGN PATENT DOCUMENTS

DE 19623595 A1 12/1997
DE 102009049635 A1 4/2011
(Continued)

OTHER PUBLICATIONS

German Search Report dated Jun. 23, 2021 for the counterpart German Patent Application No. 10 2021 202 273.1.
(Continued)

*Primary Examiner* — Jelani A Smith
*Assistant Examiner* — Paul A Castro

(57) ABSTRACT

A method for controlling actuators acting on vehicle wheels of a motor vehicle comprises
ascertaining a force to be brought about on a reference point of the motor vehicle on the basis of driver specifications,
ascertaining wheel forces to be brought about on the vehicle wheels to implement the force to be brought about on the reference point of the motor vehicle by means of a first dynamic allocation by model-based predictive control (MPC),
ascertaining setpoint values for wheel parameters from the ascertained wheel forces, and
actuating the actuators of the motor vehicle so as to implement the setpoint values of the wheel parameters.

11 Claims, 7 Drawing Sheets

(51) Int. Cl.
| | |
|---|---|
| *B60W 10/184* | (2012.01) |
| *B60W 30/182* | (2020.01) |
| *B60W 50/00* | (2006.01) |
| *B60W 50/10* | (2012.01) |

(52) U.S. Cl.
CPC ...... *B60W 30/182* (2013.01); *B60W 50/0097* (2013.01); *B60W 50/10* (2013.01); *B60W 2520/26* (2013.01); *B60W 2520/28* (2013.01); *B60W 2520/30* (2013.01); *B60W 2540/18* (2013.01); *B60W 2720/30* (2013.01)

(58) Field of Classification Search
CPC ............. B60W 50/10; B60W 2520/26; B60W 2520/28; B60W 2520/30; B60W 2540/18; B60W 2720/30; B60W 2050/0031; B60W 2050/0036; B60W 2050/0037; B60W 2540/10; B60W 2720/20; B60W 2720/26; B60W 2720/28; B60W 2720/40; B60W 10/04; B60T 2270/86; B60T 8/1755
See application file for complete search history.

(56) References Cited

U.S. PATENT DOCUMENTS

| | | | | |
|---|---|---|---|---|
| 10,407,035 | B1 * | 9/2019 | Gadda ................... | B60W 10/20 |
| 12,275,466 | B2 * | 4/2025 | Varunjikar ........... | B62D 5/0484 |

FOREIGN PATENT DOCUMENTS

| | | |
|---|---|---|
| DE | 102012213259 A1 | 1/2014 |
| DE | 102018122948 A1 | 3/2020 |

OTHER PUBLICATIONS

The International Search Report and the Written Opinion of the International Searching Authority mailed on for the counterpart PCT Application No. PCT/.

Bachle et al., "Slip-Constrained Model Predictive Control Allocation for an All-Wheel Driven Electric Vehicle", Proceedings of the 19th World Congress the international Federation of Automatic Control Cape Town, South Africa, Aug. 24-29, 2014, ISBN/ISSN: 1474-6670.

Berntorp et al., "Hierarchical Predictive Control for Ground-Vehicle Maneuvering", 2015 American Control Conference Palmer House Hilton, pp. 2771-2776, Jul. 1-3, 2015, Chicago, IL, USA.

Request for the Submission of an Opinion dated Oct. 29, 2024 for the counterpart Korean Patent Application No. 0-2023-7004505 and machine translation of same.

Written Decision on Registration dated Dec. 31, 2024 for the counterpart Korean Patent Application No. 0-2023-7004505 and machine translation of same.

* cited by examiner

MOTION CONTROL IN MOTOR VEHICLES

CROSS-REFERENCE TO RELATED APPLICATIONS

The present application is a National Stage Application under 35 U.S.C. § 371 of International Patent Application No. PCT/DE2021/200103 filed on Aug. 10, 2021, and claims priority from German Patent Application No. 10 2020 210 332.1 filed on Aug. 13, 2020 and German Patent Application No. 10 2021 202 273.1 filed on Mar. 9, 2021, in the German Patent and Trademark Office, the disclosures of which are herein incorporated by reference in their entireties.

TECHNICAL FIELD

The invention relates to a method for controlling actuators acting on vehicle wheels of a motor vehicle.

BACKGROUND

The motion control for autonomous and manual driving is intended to meet the increased requirements of the future for energy efficiency, safety and driving dynamics. The software is intended here to integrate and actuate all available active and semiactive actuators-steering, brake, drive and dampers-on a centralized computing platform, in order in this way to provide a harmonious driving experience. For this purpose, the horizontal longitudinal and transverse dynamics of a vehicle must especially be coordinated as well as possible.

The horizontal vehicle motion is determined by the wheel steering angles and wheel torques at each point in time, which also determine the horizontal tire forces. A further important aspect is the assignment of the motion commands to the individual actuators. In the case of so-called overactuated systems, the number of control variables exceeds the number of degrees of freedom of the vehicle motion.

For example, DE 10 2009 049 635 A1 describes motion control of vehicles with more actuators than degrees of freedom, with a static, direct allocation of manipulated variables for the actuators. The driving dynamics controller is separate here from the actuator allocation, which can potentially lead to controller output values that cannot be implemented. Simple, rule-based allocations, such as for example the wheel pressure distributions in today's ESC control systems, are widely used. These approaches generally do not achieve a global optimum, and consequently do not exploit the full potential of the actuators.

SUMMARY

A method for controlling actuators acting on vehicle wheels of a motor vehicle comprises the following steps ascertaining a force to be brought about on a reference point of the motor vehicle on the basis of driver specifications, ascertaining wheel forces to be brought about on the vehicle wheels to implement the force to be brought about on the reference point of the motor vehicle by means of a first dynamic allocation by model-based predictive control, ascertaining setpoint values for wheel parameters from the ascertained wheel forces, and actuating the actuators of the motor vehicle so as to implement the setpoint values of the wheel parameters.

The concept of the motion control is based on the principle of inverse dynamics. This means working back from the desired kinematic motion while taking into account the inertial properties of the vehicle, in order to ascertain the corresponding controlled variables, specifically in particular the dynamic tire forces and the corresponding wheel torques and wheel steering angles. In order to compensate for disturbance variables, measures such as suitable controls and disturbance compensation are preferably used. When ascertaining the controlled variables, the control system is preferably divided into a number of cascading levels, which are connected by clearly defined interfaces.

In order to allow coordinated actuator operation, optimization-based allocation algorithms may be used.

Possible vehicle motions are influenced by a series of factors: the performance limits of the actuators and sensors, the road conditions, passenger comfort and safety, energy and emissions, the preferences of the driver and infrastructure factors. These factors may be systematically taken into account already at the highest cascade level in the design of the control system. Continuous forecasting capabilities may also be included. This is ensured by the advanced control method of model-based predictive control, which is capable of optimizing vehicle operation and shortening the time to market for ever more complex vehicle systems.

The predictive approach controls the driving and wheel dynamics and allows constraints to be included in the optimization. These are especially the restrictions of the wheel forces and the driving dynamics caused by the friction coefficient and the limitations of the actuators. This ensures that the longitudinal and transverse dynamics are coordinated within the physically available limits. In addition, prioritizations with regard to driving-dynamic and energy-related variables can be provided by power functions.

In an embodiment, the driver specifications are made available by a virtual driver and/or an assistance system. This takes place as an alternative or in addition to a human driver, who can enter the driver specifications for example by a gas pedal, a brake pedal and a steering wheel. A virtual driver can additionally specify a rear-wheel steering angle, which is used for motion control.

In an embodiment, the driver specifications are an acceleration and/or at least one steering angle. These are the core specifications for controlling a vehicle.

In an embodiment, the setpoint values for the wheel parameters are torques respectively acting on the wheels, slip values of the wheels, rotational speeds of the wheels and/or steering angles of the wheels.

In an embodiment, for implementing a setpoint value for a torque acting on a vehicle wheel, the method also has a second dynamic allocation, which includes slip control. In this way, the torque on a wheel can also be divided among the available actuators in an optimized way.

In an embodiment, the actuators are electric motors and/or friction brakes.

In an embodiment, in an intermediate step, kinematic setpoint motion variables are adapted by way of a virtually controlled single-track model and are taken into account in the dynamic allocation of the wheel forces.

In an embodiment, the dynamic allocation of the wheel forces includes driving dynamics control. The combination of allocation and driving dynamics control ensures that the driving dynamics control can maximally and optimally utilize the possibilities, without making specifications which cannot be implemented by the actuators.

In an embodiment, provisional wheel forces are ascertained by means of a static allocation and these are fed to the dynamic allocation as input values or starting values. After that, an arbitration may be carried out from the ascertained wheel forces of the static and the dynamic allocation.

In an embodiment, the dynamic allocation considers a saturation of an assigned actuator, a reconfiguration to ensure the error tolerance in the event of failure of the actuator, an increase in the energy efficiency and a minimization of wear.

In an embodiment, the ascertained wheel forces are converted by an inverse tire-force model into setpoint variables for torques, wheel slips, rotational speeds and steering angles of the wheels.

BRIEF DESCRIPTION OF THE DRAWINGS

Further features, advantages and possible applications of the invention also result from the following description of exemplary embodiments on the basis of calculations and the drawings. All of the features described and/or pictorially depicted belong to the subject matter of the invention both individually and in any combination, also independently of their summarization in the claims or the back-references thereof.

DETAILED DESCRIPTION

Figure 1:
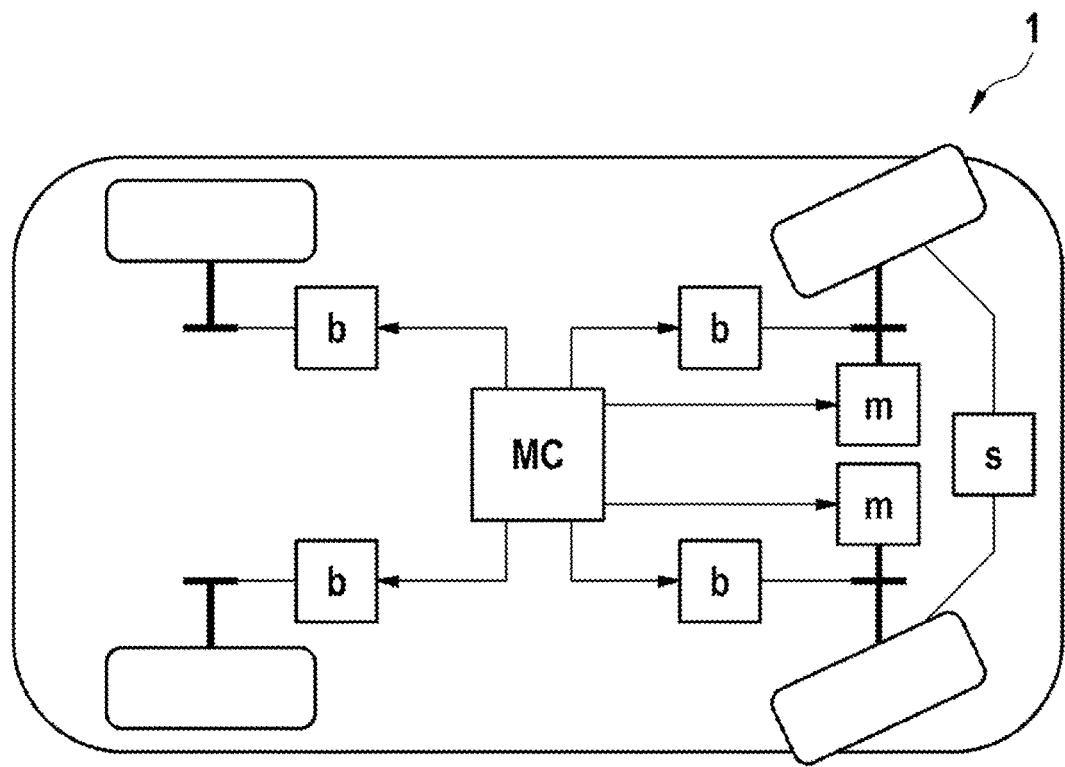
FIG. 1 shows a vehicle configuration with a motion control.

FIG. 1 shows a vehicle configuration for the motion control (MC) of the vehicle. The motion control (MC) has access to all brakes (b), which may for example be electro-mechanically formed, and both electric motors (m) on the front axle, which are suitable for regenerative braking. With this configuration, improved torque vectoring and blending can be realized, which improves the energy efficiency, the stability and the handling of the vehicle. The steering(s) cannot be controlled by the motion control (MC).

The regenerative braking improves the comfort of the driver and the passengers during the journey and extends the range of the vehicle.

Figure 2:
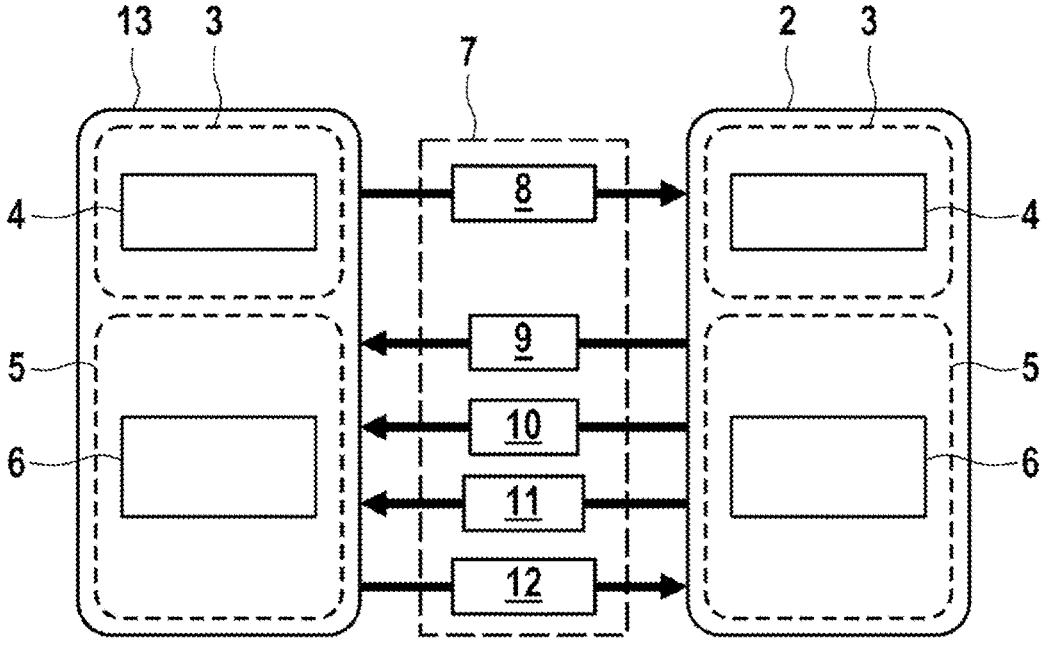
FIG. 2 shows the setup in parent-child systems.

The motion control concept uses elements which are inspired by object-oriented design. The elements that are used here have a setup which replicates the overall system respectively in parent systems 13 and child systems 2 (parent/child system pairs) along various functional chains, as represented in FIG. 2. The functional chains are either set up for specific purposes or represent external influences such as waste heat. Examples of parent/child system pairs are vehicle/chassis, chassis/corner or corner/actuator. Each system distinguishes internally between information providers/observers 3 (observer functions) and managers 4. Observer functions 3 provide estimated or measured actual values 9 for their own and the parent level 13 and coordinate the boundary conditions 10, which they obtain from the child level 2. They may also provide estimated or measured disturbances ("counters") 12, which are used by their own or subordinate systems for improving the quality of the control. Manager functions ascertain requirements 8 for controlling the respective child system. They may also receive desired commands 11 from child levels and adjust them with their own requirements 8.

At vehicle level, the longitudinal and transverse requirements are determined by dynamic pre-control with personalizable vehicle response behavior and damping properties. A central element at chassis level is a model-predictive controller (MPC), which requires the forces of the curve module while taking into account stability and energy limits. For describing the chassis dynamics, a two-track model is used. Time-variant system matrices are produced by linearization and discretization at each sampling time. Friction circles between the tires and the road, which restrict the admissible forces on the wheels, are approximated by polytopes. These measures are intended to ensure the applicability of the convex quadratic programming that is suitable for the embedded real-time optimization. At the corner level, the modules process the incoming stream of chassis requirements and produce a stream of corresponding requirements for the actuators. An MPC framework for corner modules is capable of optimally dividing the wheel braking torque among the redundant actuators on the front axle, while traction control and antilock functions are provided by wheel slip control on all wheels. This approach offers a rapid transient response, without impairing the energy recovery efficiency of the electric motors, with different dynamic authorities of the friction brake and the electric motor being taken into account.

Figure 3:
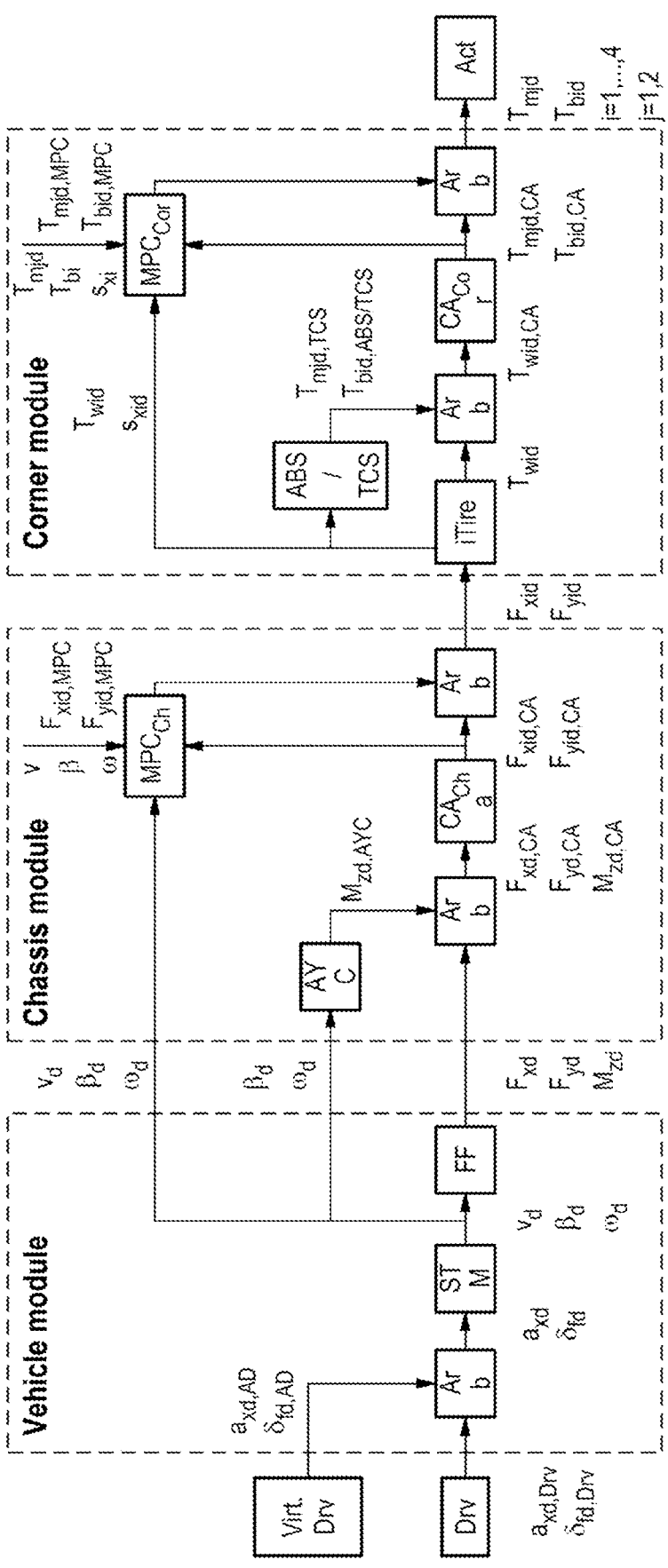
FIG. 3 schematically shows the motion control concept.

FIG. 3 shows the overall structure of the motion control concept. The system comprises modern methods, such as electronic stability control (ESC), active yaw control (AYC), antilock braking system (ABS) and traction control system (TCS). The arbitrator blocks (Arb) and an inverse tire model (iTire) are used for this. The remaining blocks in the control chain are the human driver (Drv), a single-track model (STM) with a virtual controller (VC), a feedforward control (FF), a static control assignment (CA), observers (Obs) and the actuators (Act), i.e. two electric motors on the front axle and friction brakes on each wheel. The specific variables are explained below. A virtual driver (Virt. Drv) can be used in special situations, in order to overrule the driver, whereby autonomous driving (AD) can also be directly integrated.

There follows firstly a general overview and then an increasingly detailed discussion of the systematic derivation and the setup of the models and also the generic structure of the optimization problem, which represents the basis for the model-predictive control.

The model-predictive control is an advanced optimization-based control method. By contrast with linear-quadratic (LQ) control, MPC offers the explicit handling of process restrictions resulting from natural requirements, for example energy efficiency, safety, actuator limits and others. The control decisions in MPC are calculated online on the basis of an internal model of the system dynamics.

All models in the motion control concept are based generally on linear time-variant discrete models with n state variables in the vector x, m inputs or control actions in u and p outputs in y. Each time-discrete model is derived from a non-linear time-continuous model in state space form.

$$\dot{x}=f(x,u),\ x(t_0)=x_0$$

$$y=h(x,u)$$

The non-linear state space model is linearized along a reference trajectory for the state Xd and the control action $u_d$, which leads to $$f(x,u) \approx f(x_d,u_d) + \underbrace{\frac{\partial f}{\partial x^T}|_{x_d,u_d}}_{A}(x-x_d) + \underbrace{\frac{\partial f}{\partial u^T}|_{x_d,u_d}}_{B}(u-u_d),$$

-continued $$h(x, u) \approx h(x_d, u_d) + \underbrace{\frac{\partial h}{\partial x^T}\big|_{x_d, u_d}(x - x_d)}_{C} + \underbrace{\frac{\partial h}{\partial u^T}\big|_{x_d, u_d}(u - u_d)}_{D}.$$

The result is an affine linear approximation of the non-linear system with the system matrices A, B, C, D and the affine vectors $h_x$ and $h_y$, which are generally time-variant $$\dot{x} = Ax + Bu + h_x, \quad h_x = f(x_d, u_d) - Ax_d - Bu_d,$$

$$y = Cx + Du + h_y, \quad h_y = h(x_d, u_d) - Cx_d - Du_d.$$

The affine approximation allows the system variables to be used directly in the optimization and the problematic mixing of absolute values and difference-from-setpoint values is avoided. In the motion control concept, two discretization methods are used: The low-cost, but less accurate Euler forward method and the more accurate, but also more expensive Tustin (trapezoidal) method. A discrete model is characterized in the following by an index k. With the sampling time Ts, the Euler discretization for the affine system leads to $$A_k = I_n + AT_s,$$

$$B_k = BT_s, \quad C_k = C, \quad D_k = D,$$

$$h_{xk} = h_x T_s, \quad h_{yk} = h_y$$

The Tustin discretization is only used for non-affine systems and is given by the following transformation. This generally results in a direct implementation matrix Dk.

$$A_k = \left(I_n - A\frac{T_s}{2}\right)^{-1}\left(I_n + A\frac{T_s}{2}\right),$$

$$B_k = \left(I_n - A\frac{T_s}{2}\right)^{-1} BT_S,$$

$$C_k = C\left(I_n - A\frac{T_s}{2}\right)^{-1},$$

$$D_k = D + C\left(I_n - A\frac{T_s}{2}\right)^{-1} B\frac{T_s}{2}$$

It has previously been assumed that the predictive controller calculates the control input $u_k$ in its absolute form. However, this is not the only possibility for producing inputs for the system. In certain applications, changes of the input $u_k$ can be calculated. This formulation is also referred to as rate-based or integral action formulation. The reason for using a controller formulation with integral action is to obtain offset-free tracking. There are several possible ways of expressing the controller model in its incremental, integrating form. With the incremental vectors $$\Delta x_k = X_k - X_{k-1}, \quad \Delta u_k = U_k - u_{k-1}, \quad \Delta y_k = y_k - y_{k-1}$$

the integral mode of action of the state space system is specified below, with the assumption that the time-variant system matrices and affine vectors do not differ very much between two consecutive time samples.

$$\Delta x_{k+1} = A_k \Delta x_k + B_k \Delta u_k + \Delta h_{xk},$$

$$y_k = y_{k-1} + C_k \Delta x_k + D_k \Delta u_k + \Delta h_{yk}$$

The system description above does not correspond to the generic form that we introduced further above. In order to restore the generic form also for integral actions, the system state is extended with the output of the previous sampling interval. The extended system is then as follows $$\begin{bmatrix} \Delta x_{k+1} \\ y_k \end{bmatrix} = \begin{bmatrix} A_k & 0 \\ C_k & I_p \end{bmatrix}\begin{bmatrix} \Delta x_k \\ y_{k-1} \end{bmatrix} + \begin{bmatrix} B_k \\ D_k \end{bmatrix}\Delta u_k + \begin{bmatrix} \Delta h_{xk} \\ \Delta h_{yk} \end{bmatrix},$$

$$y_k = \begin{bmatrix} C_k & I_p \end{bmatrix}\begin{bmatrix} \Delta x_k \\ y_{k-1} \end{bmatrix} + D_k \Delta u_k + \Delta h_{yk}$$

A further use of the state space model is to provide a prediction of the system state and the output over a specific time period into the future. With the so-called "batch" approach, it is possible to express the dynamics of the state and output vector for a specified time horizon N by backward multiplication of the linear matrices and vectors. The batch form for discrete linear time-variant affine systems is denoted as follows and must be newly set up in each sampling interval $$\begin{bmatrix} x_1 \\ x_2 \\ x_3 \\ \vdots \\ x_N \end{bmatrix} = \bar{A}x_0 + \bar{B}\begin{bmatrix} u_0 \\ u_1 \\ u_2 \\ \vdots \\ u_{N-1} \end{bmatrix} + \bar{H}_x\begin{bmatrix} h_{x0} \\ h_{x1} \\ h_{x2} \\ \vdots \\ h_{xN-1} \end{bmatrix},$$

$$\begin{bmatrix} y_0 \\ y_1 \\ y_2 \\ \vdots \\ y_{N-1} \end{bmatrix} = \bar{C}x_0 + \bar{D}\begin{bmatrix} u_0 \\ u_1 \\ u_2 \\ \vdots \\ u_{N-1} \end{bmatrix} + \bar{H}_{yx}\begin{bmatrix} h_{x0} \\ h_{x1} \\ h_{x2} \\ \vdots \\ h_{xN-1} \end{bmatrix} + \begin{bmatrix} h_{y0} \\ h_{y1} \\ h_{y2} \\ \vdots \\ h_{yN-1} \end{bmatrix}$$

$$\bar{A} = \begin{bmatrix} A_0 \\ A_1 A_0 \\ A_2 A_1 A_0 \\ \vdots \\ \prod_{j=0}^{N-1} A_{N-1-j} \end{bmatrix}, \bar{C} = \begin{bmatrix} C_0 \\ C_1 A_0 \\ C_2 A_1 A_0 \\ \vdots \\ C_{N-1}\prod_{j=0}^{N-1} A_{N-1-j} \end{bmatrix}, \bar{H}_x = \begin{bmatrix} I_n & 0 & 0 & \cdots & 0 \\ A_1 & I_n & 0 & \cdots & 0 \\ A_2 A_1 & A_2 & I_n & \cdots & 0 \\ \vdots & \vdots & \vdots & \ddots & \ddots & \vdots \\ \left(\prod_{j=1}^{N-1} A_{N-j}\right) & \left(\prod_{j=1}^{N-2} A_{N-j}\right) & \cdots & A_{N-1} & I_n \end{bmatrix}$$

-continued $$\overline{B} = \begin{bmatrix} B_0 & 0 & 0 & \cdots & 0 \\ A_1 B_0 & B_1 & 0 & \cdots & 0 \\ A_2 A_1 B_0 & A_2 B_1 & B_2 & \cdots & 0 \\ \vdots & \vdots & \ddots & \ddots & \vdots \\ \left(\prod_{j=1}^{N-1} A_{N-j}\right) B_0 & \left(\prod_{j=1}^{N-2} A_{N-j}\right) B_1 & \cdots & A_{N-1} B_{N-2} & B_{N-1} \end{bmatrix}$$

$$\overline{D} = \begin{bmatrix} D_0 & 0 & 0 & \cdots & 0 \\ C_1 B_0 & D_1 & 0 & \cdots & 0 \\ C_2 A_1 B_1 & C_2 B_1 & D_2 & \cdots & 0 \\ \vdots & \vdots & \ddots & \ddots & \vdots \\ C_{N-1}\left(\prod_{j=1}^{N-2} A_{N-1-j}\right) B_{N-2} & C_{N-1}\left(\prod_{j=1}^{N-3} A_{N-1-j}\right) B_{N-2} & \cdots & C_{N-1} B_{N-2} & D_{N-1} \end{bmatrix},$$

$$\overline{H}_{yx} = \begin{bmatrix} 0 & 0 & 0 & \cdots & 0 \\ C_1 & 0 & 0 & \cdots & 0 \\ C_2 A_1 & C_2 & 0 & \cdots & 0 \\ \vdots & \vdots & \ddots & \ddots & \vdots \\ C_{N-1}\left(\prod_{j=1}^{N-2} A_{N-1-j}\right) & C_{N-1}\left(\prod_{j=1}^{N-3} A_{N-1-j}\right) & \cdots & C_{N-1} & 0 \end{bmatrix}$$

Essentially, an MPC controller is based on an iterative optimization with a finite horizon (constrained) of a route model. At each discrete sampling time (k), the route is sampled and the actual state xk is measured or estimated with the help of observers. The performance of the controller is expressed by a so-called cost function. Based on a dynamic model of the route, this cost function is formulated in such a way that it expresses the behavior of the MPC controller in the future for a current route state Xk and a series of future inputs $u_k$. In other words, this predicted cost function gives a numerical indicator of the quality of the control, with the assumption that the current system state is influenced by a specific sequence of inputs from the past. The question is not how the controller will perform, but what is the sequence of inputs $u_k$ that produces the best performance. In order to compute the optimal sequence of inputs, the cost function must be minimized at each sampling interval by using a numerical optimization algorithm. As in the case of most actual systems, the inputs, outputs and states can be restricted by physical boundary conditions, which can easily be included in the numerical minimization task. From the sequence of future inputs $u_k$, only the first one is applied, then the process is repeated on the basis of brand-new measured state information. This type of repeated measure-predict-optimize-apply cycle is referred to as receding horizon control.

The MPC optimization approach used in the present motion control concept comprises the following generic form, where N denotes the forecast horizon and M denotes the control horizon, $$\min_{u_{c0:M-1},\varepsilon} J_T(x_k, u_k) + \gamma J_E(x_k, u_k) + P\varepsilon^2$$

$$x_{k+1} = A_k x_k + B_k u_k + h_{xk}$$

$$y_k = C_k x_k + D_k u_k + h_{yk}$$

$$w_k = C_{wk} x_k + D_{wk} u_k + \varepsilon V_w$$

$$[u_0^T, \dots, u_{N-1}^T]^T = (M \otimes I_m)[u_{c0}^T, \dots, u_{cM-1}^T]^T$$

$$x_0 = x_k$$

-continued $$u_{min} \le u_k \le u_{max}$$

$$y_{min} - \varepsilon V_{y,min} \le y_k \le y_{max} + \varepsilon V_{y,max}$$

$$\Delta u_{min} - \varepsilon V_{\Delta u,min} \le \Delta u_k \le \Delta u_{max} + \varepsilon V_{\Delta u,max}$$

$$H_{xk} x_k + H_{uk} u_k \le b_{Hk} + \varepsilon V_H$$

$$0 \le \varepsilon$$

$$\forall k \in \{0, \dots, N-1\}$$

The overall cost function is divided into a trajectory tracking part $J_T$, an energy consumption part JE and a slip variable $\varepsilon$, provided with the weighting P. The constraints of the MPC problem can be divided into equality and inequality constraints. The first three equality constraints are the state and output model of the vehicle dynamics in affine form and a general soft constraint as a linear combination of state and input, reduced by the slip variable. The target vector $w_k$ is either zero or must be specified externally. The next equality constraint is used to realize a control horizon that is shorter than the forecast horizon, specifically by motion blocking. The matrix M determines the blocking scheme and the operator symbol is the Kronecker product. The last equality constraint maps the initial state onto the current state of the sampling period. The inequality constraints determine the bounds for the input $u_k$, the output yk and the input rate $u_k$. The last two are reduced in order to ensure the feasibility of the optimization. A polytopic set constraint, which is optionally relaxed, and the non-negativity of the slip variables are the remaining inequality constraints. The cost function used for target tracking is quadratic and allows the output error, the input error and the input rate to be penalized by the symmetrical positively semi-definite weighting matrices Q, R and RA.

$$J_T = \sum_{k=0}^{N} \left( (y_k - y_{dk})^T Q(y_k - y_{dk}) \right) + \sum_{k=0}^{N-1} \left( (u_k - u_{dk})^T R(u_k - u_{dk}) + \Delta u_k^T R_\Delta \Delta u_k \right)$$

Any energy-or performance-related function can be used for the energy consumption part JE of the cost function. The only constraint is that the cost function must be quadratic and/or linear. The relative importance of the energy costs can be specified by the weighting factor. A typical power-related function is the power loss $P_{loss}$ of electric motors, which can be formulated on the basis of the electric motor torque $T_m$, the wheel speed w and given efficiency maps for generation and drive, $$P_{loss} = \begin{cases} |T_m|\omega_W - |T_m|\omega_W \eta_{gen}(T_m, \omega_w), & T_m < 0 \\ \dfrac{T_m \omega_w}{\eta_{mot}(T_m, \omega_w)} - T_m \omega_w, & T_m \geq 0 \end{cases}$$

The efficiency maps are generally not quadratic, so that an approximation at a specific operating point with linear and quadratic terms can be used in the following form $$J_E = \nabla^2 P_{loss}|_{T_m=T_{m0}} \Delta T_m^2 + \nabla P_{loss}|_{T_m=T_{m0}} \Delta T_m$$

The following convex quadratic program (QP), which is reliably and efficiently solvable, is used to solve the optimization problem online.

$$\min_z \frac{1}{2} z^T H z + f^T z$$

$$\text{subject to} \quad A_{eq} z = b_{eq}$$

$$A_{ineq} z \leq b_{ineq}$$

The optimization vector z is given by $$z = \left[ x_0^T, \dots, x_N^T, u_0^T, \dots, u_{N-1}^T, u_{c0}^T, \dots, u_{cM-1}^T, \varepsilon \right]^T.$$

The only free variables for the optimization are the control interventions $U_{c0..M-1}$ and the slip $\zeta$. Only the first controlled variable uco is used for controlling the system. The other variables, in particular the state x, are also optimal in terms of QP optimization and can be used for other purposes, for example for the transformation of data in subsequent steps. With this optimization vector, the optimization is in a so-called "sparse" or "recursive" form, by contrast with the "dense" or "batch" formulation. In the case of the latter, the state in the optimization problem is eliminated, which leads to an alternative QP problem. The Hessian matrix H and the gradient vector f are given as $$H = \begin{bmatrix} Q_{CC} & Q_{CD} & 0 & 0 \\ Q_{DC} & Q_{DD} + R_u + A_\Delta^T R_{\Delta u} A_\Delta & 0 & 0 \\ 0 & 0 & 0 & 0 \\ 0 & 0 & 0 & P \end{bmatrix},$$

$$f = \begin{bmatrix} Q_C & 0 & 0 & 0 \\ Q_D & R_u & 0 & 0 \\ 0 & 0 & 0 & 0 \\ 0 & 0 & 0 & 0 \end{bmatrix} \begin{bmatrix} h_{y,pred} - y_{d,pred} \\ -u_{d,pred} \\ 0 \\ 0 \end{bmatrix} - \begin{bmatrix} 0 \\ A_\Delta^T R_{\Delta u} A_\Delta u_{-1} \\ 0 \\ 0 \end{bmatrix}$$

With the following vectors $$y_{d,pred} = \left[ y_{d0}^T, \dots, y_{dN}^T \right]^T,$$

-continued $$h_{y,pred} = \left[ h_{y0}^T, \dots, h_{yN}^T \right]^T,$$

$$u_{d,pred} = \left[ u_{d0}^T, \dots, u_{dN-1}^T \right]^T,$$

$$u_{pred} = \left[ u_0^T, \dots, u_{N-1}^T \right]^T,$$

$$\Delta u_{pred} = \left[ \Delta u_0^T, \dots, \Delta u_{N-1}^T \right]^T = A_\Delta u_{pred} - A_\Delta u_{-1}, u_{-1} = \underbrace{\left[ u_{k-1}^T, \dots, u_{k-1}^T \right]^T}_{N-1 \; times}$$

And matrices of the cost function $$Q_{CC} = \begin{bmatrix} C_0^T Q C_0 & & \\ & \ddots & \\ & & C_N^T Q C_N \end{bmatrix},$$

$$Q_{CD} = \begin{bmatrix} C_0^T Q D_0 & & \\ & \ddots & C_{N-1}^T Q D_{N-1} \\ 0 & \cdots & 0 \end{bmatrix},$$

$$Q_{DC} = \begin{bmatrix} D_0^T Q C_0 & & 0 \\ & \ddots & \vdots \\ & & D_{N-1}^T Q C_{N-1} & 0 \end{bmatrix},$$

$$Q_{DD} = \begin{bmatrix} D_0^T Q D_0 & & \\ & \ddots & \\ & & D_{N-1}^T Q D_{N-1} \end{bmatrix},$$

$$R_u = \begin{bmatrix} R & & \\ & \ddots & \\ & & R \end{bmatrix},$$

$$R_{\Delta u} = \begin{bmatrix} R_\Delta & & \\ & \ddots & \\ & & R_\Delta \end{bmatrix},$$

$$A_\Delta = \begin{bmatrix} I_m & 0 & \cdots \\ I_m & I_m & \cdots \\ \vdots & \vdots & \ddots \\ I_m & I_m & \cdots \end{bmatrix}^{-1},$$

$$Q_c = \begin{bmatrix} C_0^T Q & & \\ & \ddots & \\ & & C_N^T Q \end{bmatrix},$$

$$Q_D = \begin{bmatrix} D_0^T Q & & 0 \\ & \ddots & \vdots \\ & & D_{N-1}^T Q & 0 \end{bmatrix}$$

The linear equality constraints are given by the matrix $A_{eq}$ and the vector $b_{eq}$, $$A_{eq} = \begin{bmatrix} -I_n & & & 0 & \cdots & 0 & 0 & \cdots & 0 & 0 \\ A_0 & -I_n & & & B_0 & & 0 & \cdots & 0 & 0 \\ & \ddots & \ddots & & & \ddots & \vdots & \ddots & \vdots & \vdots \\ & & A_{N-1} & -I_n & & B_{N-1} & 0 & \cdots & 0 & 0 \\ C_{w0} & & & 0 & D_{w0} & & 0 & \cdots & 0 & V_w \\ & \ddots & & & \ddots & & \vdots & \ddots & \vdots & \vdots \\ & & C_{wN-1} & 0 & & D_{wN-1} & 0 & \cdots & 0 & V_w \\ 0 & \cdots & 0 & 0 & I_m & & -I_m & & & 0 \\ \vdots & \ddots & \vdots & \vdots & & \ddots & & -I_m & 0 \\ 0 & \cdots & 0 & 0 & & I_m & & -I_m & 0 \end{bmatrix},$$

-continued $$b_{eq} = \begin{bmatrix} x_k \\ -h_{x0} \\ \vdots \\ -h_{xN-1} \\ w_0 \\ \vdots \\ w_{N-1} \\ 0 \\ \vdots \\ 0 \\ \vdots \\ 0 \end{bmatrix}$$

The inequality constraints are collected in the matrix $A_{ineq}$ and the vector $b_{ineq}$, $$A_{ineq} = \begin{bmatrix} 0 & 0 & \text{diag}(I_m) & 0 & 0 \\ 0 & 0 & -\text{diag}(I_m) & 0 & 0 \\ 0 & \text{diag}(C_{k+1}) & \text{diag}(D_k) & 0 & -\overline{V}_{y,max} \\ 0 & -\text{diag}(C_{k+1}) & -\text{diag}(D_k) & 0 & -\overline{V}_{y,min} \\ 0 & 0 & A_\Delta & 0 & -\overline{V}_{\Delta u,max} \\ 0 & 0 & -A_\Delta & 0 & -\overline{V}_{\Delta u,min} \\ 0 & \text{diag}(H_{xk+1}) & \text{diag}(H_{uk}) & 0 & -\overline{V}_H \\ 0 & 0 & 0 & 0 & -1 \end{bmatrix},$$

$$b_{ineq} = \begin{bmatrix} \overline{u}_{max} \\ -\overline{u}_{min} \\ \overline{y}_{max} - \overline{h}_{y,pred} \\ -\overline{y}_{min} + \overline{h}_{y,pred} \\ \overline{\Delta u}_{max} + A_\Delta u_{-1} \\ -\overline{\Delta u}_{min} - A_\Delta u_{-1} \\ \overline{b}_H \\ 0 \end{bmatrix}$$

The index k ranges from horizon step 0 to N-1 and the overline symbol identifies the corresponding vectors. The min and max limits are repeated here for each step of the horizon, but if a prediction is available along the horizon, the limits may differ from step to step. It should be noted that enforcing output constraints in the initial step is only meaningful if the input directly influences the constrained outputs. On the other hand, enforcing output constraints in the final step is only meaningful if there is no direct flow from the input to the output. These restrictions also apply analogously to the cost function.

The motion control requirements are as follows:

In straight-ahead driving or braking situations, the energy efficiency should have priority. In such cases, the maximum regenerative braking torque should be provided.

In cornering situations, agility should be improved under normal driving conditions and, in the area at the limit of tire-road friction, vehicle stability should have absolute priority.

Stability has priority in the event of failure of a brake actuator and the drivetrain should assist the deceleration process (stabilization and max. decelerating power)

In the following sections, the tasks of all modules of the motion control concept are described and the models and all necessary data are explained in more detail.

The task of the vehicle manager is to ascertain setpoint values for the vehicle state and the global forces that act on the body at the center of gravity (CoG). The vehicle manager is designed as a model-based feedforward control. The reference vehicle state is ascertained with the aid of a flat, linear single-track model, in which the longitudinal and transverse motion are only coupled by the vehicle speed. The input into the single-track model is the front steering angle and the acceleration required by the driver. Optionally, a virtual driver may also require a rear steering angle. In this case, the virtual controller (VC) described below is deactivated.

The longitudinal state of the vehicle, i.e. the reference vehicle speed $V_d$, is simply ascertained from the integration of the required driver acceleration $a_{xd}$ minus an estimated resistance, i.e. the disturbance variable $a_{dis}$. If the disturbance variable were not taken into account, the reference vehicle speed would be less realistic and would not be achievable by a tracking controller. The longitudinal reference model and its state space representation are given by $$V_d = a_{xd} - a_{dis}$$

$$x = V_d, \ u = [a_{xd} \ a_{dis}]^T, \ y = v_d,$$

$$A = 0, \ B = [1 \ -1], \ C = 0, \ D = [1 \ -1]$$

The lateral vehicle state is characterized by the sideslip angle $\beta_d$ and the yaw rate wd. In order to allow individualization of the lateral vehicle dynamics that can be selected by the driver, the lateral single-track model is virtually controlled (VC) by a virtual rear-axle steering angle $\delta_{rd,VC}$. The idea behind the virtually controlled single-track model is to offer the driver of the electric vehicle improved transverse agility and yaw damping. The virtual rear-axle steering angle controller is realized as a linearly quadratic (LQ) state-space controller with gain $K_x$ together with a forward filter $K_w$ and disturbance variable compensation $K_s$. The input to the feedforward filter is a quasi-static yaw rate $\omega_{stat}$, which is restricted by the road holding conditions. The driver's front steering angle $\delta_{fd}$ is regarded as a disturbance variable and is compensated in such a way that there is a vanishing stationary virtual steering angle. This avoids the driver having to react adaptively to a changing steady-state yaw gain caused by a non-zero virtual rear-axle steering angle. The open-loop side reference model is given in state space form by $$x = \begin{bmatrix} \beta_d \\ \omega_d \end{bmatrix},$$

$$u = \delta_{rd,VC},$$

$$s = \delta_{rd},$$

$$A_{ol} = \begin{bmatrix} a_{11} & a_{12} \\ a_{21} & a_{22} \end{bmatrix},$$

$$B_u = \begin{bmatrix} b_{u1} \\ b_{u2} \end{bmatrix},$$

$$B_s = \begin{bmatrix} b_{s1} \\ b_{s2} \end{bmatrix},$$

$$y = \begin{bmatrix} \dot{\beta}_d \\ \omega_d \\ a_y \end{bmatrix},$$

$$C_{ol} = \begin{bmatrix} a_{11} & a_{12} \\ a_{21} & a_{22} \\ c_{31} & c_{32} \end{bmatrix},$$

$$D_u = \begin{bmatrix} b_{u1} \\ b_{u2} \\ d_{u3} \end{bmatrix},$$

-continued $$D_s = \begin{bmatrix} s1 \\ b_{s2} \\ d \end{bmatrix}$$

The matrix elements of the uncontrolled lateral vehicle model result from the vehicle parameters of mass m, yaw moment of inertia $J_z$, lateral tire stiffness at the front and rear Cf, Cr and distance from the center of gravity to the front or rear axle $I_f$, $I_r$ $$a_{11} = -\frac{C_f + C_r}{mv_d},$$

$$a_{12} = -1 - \frac{C_f l_f - C_r l_r}{mv_d^2},$$

$$b_{u1} = \frac{C_r}{mv_d},$$

$$b_{s1} = \frac{C_f}{mv_d},$$

$$a_{21} = -\frac{C_f l_f - C_r l_r}{J_z},$$

$$a_{22} = -\frac{C_f l_f^2 + C_r l_r^2}{J_z v_d},$$

$$b_{u2} = -\frac{C_r l_r}{J_z},$$

$$b_{s2} = \frac{C_f l_f}{J_z},$$

$$c_{31} = -\frac{C_f + C_r}{m},$$

$$c_{32} = -\frac{C_f l_f - C_r l_r}{mv_d},$$

$$d_{u3} = \frac{C_r}{m},$$

$$d_{s3} = \frac{C_f}{m}$$

The control law for the virtual rear steering angle is given as follows, with all controller gains being specified by the longitudinal reference speed, $$\mu = -K_x x - K_s s + K_w \omega_{stat}$$

The closed-loop control matrices, taking into account the front steering angle and the static yaw rate as new inputs, have the form $$A = A_{ol} - B_u K_x, \ B = [B_s - B_u K_s \ B_u K_w],$$

$$C = C_{ol} - D_u K_x, \ D = [D_s - D_u K_s \ D_u K_w]$$

The static yaw rate is derived from a steady-state single-track model and is restricted by the tire-road friction, which is characterized by the coefficient u. The remaining parameters are the gravitational acceleration constant g and the wheelbase $I = I_r + I_f$, $$\omega_{stat} = \text{sign}(\delta_{fd}) \cdot \min(|\omega_{drv}|, |\omega_\mu|),$$

$$\omega_{drv} = \delta_{fd} \frac{v_d}{1 + EGv_d^2},$$

$$\omega_\mu = \frac{\mu g}{v_d},$$

-continued $$EG = \frac{m}{l}\left(\frac{l_r}{C_f} - \frac{l_f}{C_r}\right)$$

The closed-loop single-track model, which includes both longitudinal and transverse motion, is processed in the "batch" form described further above, in order to provide the reference data for the entire forecast horizon.

The next step in the control chain is a non-linear feed-forward control with so-called reference global forces as the output. The reference global forces, i.e. the longitudinal force $F_{xd}$, the transverse force $F_{yd}$ and the yaw moment $M_{zd}$ acting on the center of gravity, are derived from the following non-linear vehicle dynamics model in state space form. Of all the possible disturbing forces, only the wind resistance is taken into account by the aerodynamic drag coefficient parameter $k_x$. The vehicle dynamics are described in a body-fixed coordinate system with its origin at the center of gravity. The non-linear system dynamics in input-affine form and the non-linear output equations are given by $$\begin{bmatrix} \dot{v}_x \\ \dot{v}_y \\ \dot{\omega} \end{bmatrix} = \begin{bmatrix} v_y \omega - \frac{k_x}{m} v_x^2 \\ -v_x \omega \\ 0 \end{bmatrix} + \begin{bmatrix} \frac{1}{m} & 0 & 0 \\ 0 & \frac{1}{m} & 0 \\ 0 & 0 & \frac{1}{J_z} \end{bmatrix} \begin{bmatrix} F_{xd} \\ F_{yd} \\ M_{zd} \end{bmatrix},$$

$$\begin{bmatrix} v_d \\ \beta_d \\ \omega_d \end{bmatrix} = \begin{bmatrix} \sqrt{v_x^2 + v_y^2} \\ \arctan\frac{v_y}{v_x} \\ \omega \end{bmatrix}$$

The flatness property of the reference outputs $V_a$, $\beta_d$ and $\omega_d$ is exploited to calculate the global reference forces by a flatness-based inversion, i.e. the global forces are functions of the reference outputs and their first derivatives as inputs. IFor example, for the longitudinal reference force, there is the inversion $$F_{xd} = m(\dot{v}_d\cos\beta_d - v_d(\dot{\beta}_d + \omega_d)\sin\beta_d) + k_x v_d^2(1 - \sin^2\beta_d)$$

Particular attention must be paid to the disturbances. The reference speed Va already includes longitudinal disturbances and using the previous equation may cause driver confusion. A desired zero acceleration should lead to a zero longitudinal reference force $F_{xd}$. Therefore, all disturbance-related terms must be eliminated. For this purpose, the estimated disturbance $a_{dis}$ is described in the next section and a curve disturbance term is inserted into the equation. Altogether, the following model describes the desired global forces processed at each sampling time for an N-step prediction.

$$\begin{bmatrix} F_{xd} \\ F_{yd} \\ M_{zd} \end{bmatrix} = \begin{bmatrix} m(\dot{v}_d\cos\beta_d - v_d(\dot{\beta}_d + \omega_d)\sin\beta_d) + m(a_{dis} + \beta_d a_{yd}) \\ m(\dot{v}_d\sin\beta_d + v_d(\dot{\beta}_d + \omega_d)\cos\beta_d) \\ J_z\dot{\omega}_d \end{bmatrix}$$

There are two tasks of the vehicle observer: determining the forecast horizon of the driver input and estimating a longitudinal disturbance $a_{dis}$ acting on the vehicle.

There are two main approaches to predicting the driver horizon, presuming that no map or environmental sensor information is available. The first approach is simply to keep the current acceleration and steering value over the forecast horizon. The second approach is based on curve fitting. A few last sample values are stored and a curve is fitted to the data by interpolation, for example with a polynomial. The polynomial is then used for extrapolation over the entire forecast horizon. For the sake of simplicity, the first approach has been chosen below.

A Luenberger disturbance observer with two states, estimated vehicle speed Ve and longitudinal disturbance $a_{dis}$, and the desired driver acceleration $a_{xd}$ as the input is designed for the disturbance estimation. The output is the estimated vehicle speed Ve, which is compared with the actual vehicle speed v in order to reduce the estimation error. The Luenberger observer has the following time-continuous, linear, time-invariant state space form $$\begin{bmatrix} \dot{v}_e \\ \dot{a}_{dis} \end{bmatrix} \begin{bmatrix} 0 & -1 \\ 0 & 0 \end{bmatrix} \begin{bmatrix} v_e \\ a_{dis} \end{bmatrix} + \begin{bmatrix} 1 \\ 0 \end{bmatrix} a_{xd} \begin{bmatrix} L_1 \\ L_2 \end{bmatrix} (v - v_e),$$

$$v_e = \begin{bmatrix} 1 & 0 \end{bmatrix} \begin{bmatrix} v_e \\ a_{dis} \end{bmatrix}$$

The observer gains $L_1$ and $L_2$ are designed by the linearly quadratic (LQ) method and then the continuous disturbance observer is discretized by the Tustin method. The estimated longitudinal disturbance provided by the vehicle observer is kept constant over the forecast horizon.

Figure 4:
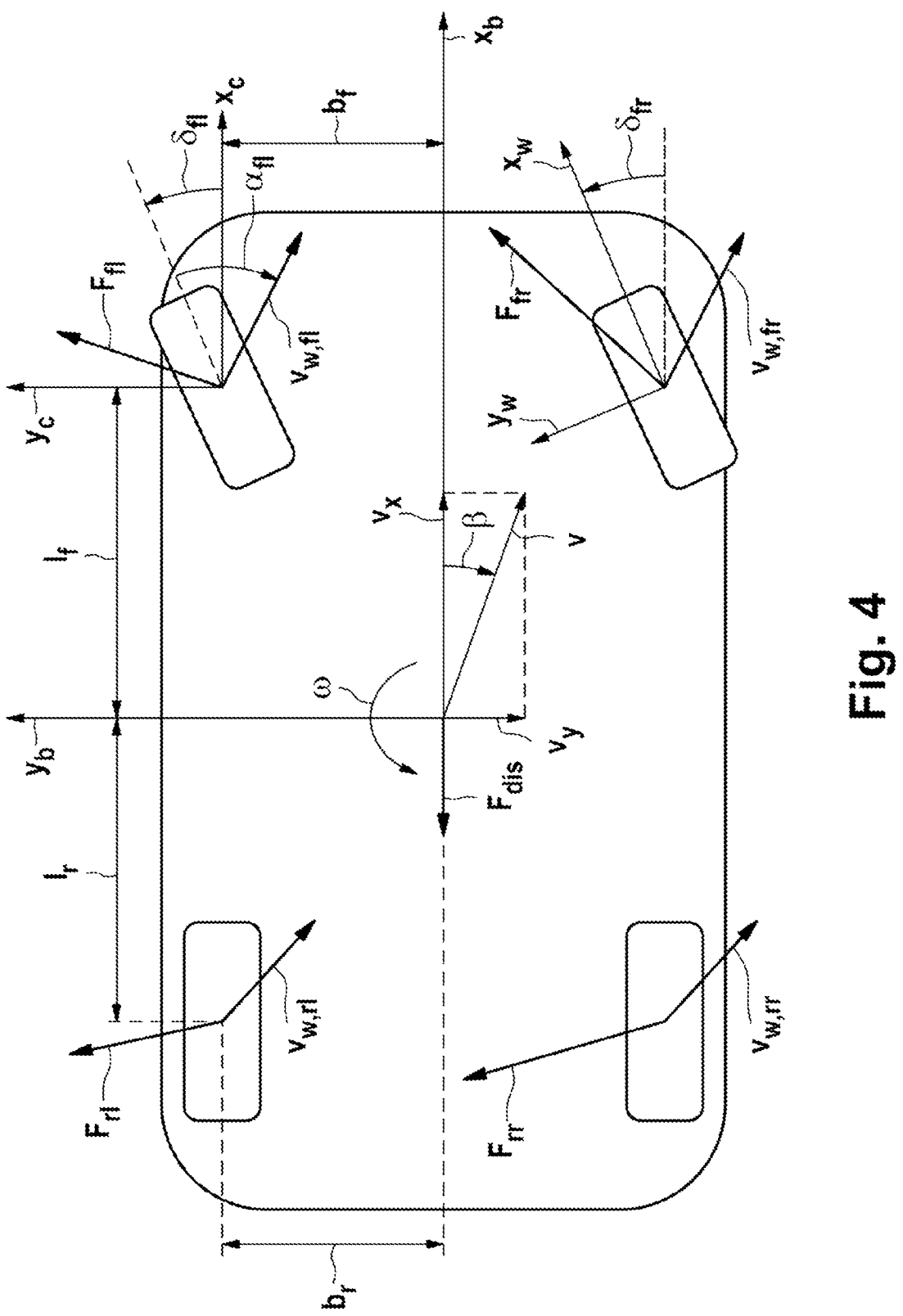
FIG. 4 shows the forces of the motor vehicle.

The task of the chassis manager is to provide optimized longitudinal and transverse forces at each corner of the vehicle. FIG. 4 shows the geometrical and kinematic variables and also the forces that are taken into account in the motion control concept. The vehicle motion is described in a horizontal, body-fixed coordinate system (index "b"). Two types of auxiliary coordinate systems are used below. The first type are systems that are fixed in each chassis corner (index "c"), but have the same orientation as the body-fixed system. The second type are systems that are fixed in each wheel corner and turned by the wheel steering angle (index "w"). At each wheel, the chassis corner system and the wheel corner system have the same origin. For the motion control concept of the embodiment described, it was decided that the chassis manager would produce the optimized corner forces specified in the chassis corner system. The use of wheel corner forces would be an alternative, with the equations of motion being more complex.

The first task of the chassis manager is to ascertain the desired reference chassis corner forces, which result from the global reference forces produced by the vehicle manager. For this purpose, a static rule assignment approach on the basis of a pseudo-inverse with a weighting matrix $W_u$ is chosen. The relationship between the global forces and the chassis corner forces is given using the distribution matrix G and the parameters of the track width at the front and rear axles, $b_f$ and $b_r$, by $$[F_{xd} \quad F_{yd} \quad M_{zd}]^T = Gu^c,$$

$$u^c = [F_{xd,fl} \quad F_{yd,fl} \quad F_{xd,fr} \quad F_{yd,fr} \quad F_{xd,rl} \quad F_{yd,rl} \quad F_{xd,rr} \quad F_{yd,rr}]^T,$$

$$G = \begin{bmatrix} 1 & 0 & 1 & 0 & 1 & 0 & 1 & 0 \\ 0 & 1 & 0 & 1 & 0 & 1 & 0 & 1 \\ -b_f & l_f & b_f & l_f & -b_f & -l_f & b_f & -l_f \end{bmatrix}$$

The above relationship between global and chassis corner forces is an underdetermined linear system that cannot be uniquely solved for uc. There are numerous methods to exploit the remaining degrees of freedom. We have chosen a weighted Moore-Penrose pseudo-inverse, which results from minimizing the weighted 2-norm $u^T W_u{}^T W_u u$, where $W_u$ is a positive diagonal matrix.

The transformation between chassis-corner and wheel-corner coordinates is possible with the rotation matrix $T^{cw}$, $$u^c = T^{cw} u^w,$$

$$u^w = T^{wc} u^c = (T^{cw})^T u^c,$$

$$v_w^w = T^{wc} v_w^c$$

$$T^{cw} = \begin{bmatrix} \cos\delta_f & -\sin\delta_f & 0 & 0 & 0 & 0 & 0 & 0 \\ \sin\delta_f & \cos\delta_f & 0 & 0 & 0 & 0 & 0 & 0 \\ 0 & 0 & \cos\delta_f & -\sin\delta_f & 0 & 0 & 0 & 0 \\ 0 & 0 & \sin\delta_f & \cos\delta_f & \cos\delta_r & -\sin\delta_r & 0 & 0 \\ 0 & 0 & 0 & 0 & \sin\delta_r & \cos\delta_r & \cos\delta_r & -\sin\delta_r \\ 0 & 0 & 0 & 0 & 0 & 0 & \sin\delta_r & \cos\delta_r \end{bmatrix}$$

As already mentioned above, the reference corner forces are required in the chassis corner systems. However, it is more favorable for the static control assignment to weight the corner forces in the wheel coordinate systems and then to perform a transformation back into the chassis systems. The reason for this is that, to achieve the aim of energy efficiency, the primary purpose of the weighting matrix $W_u$ is to favor the electric motors on the front axle before the friction brakes on both axles are used. The longitudinal wheel corner forces correspond directly to the torques at the wheels, so that the rear longitudinal wheel corner forces are weighted lower than the other forces. The overall static control assignment process is then specified by $$u_d = T^{cw} W_u^{-1} B_g^T \left( B_g W_u^{-1} B_g^T \right)^{-1} [F_{xd} \ F_{yd} \ M_{zd}]^T,$$

$$B_g = GT^{cw},$$

$$W_u = \mathrm{diag}\left(10^{-6}, \ 10^{-6}, \ 10^{-6}, \ 10^{-6}, \ 1, \ 10^{-6}, \ 1, \ 10^{-6}\right).$$

The second task of the chassis manager is to use a model-based predictive control (MPC) for the tracking of the reference states and inputs and to keep all states and control actions within their limits. In a first step, the non-linear vehicle model defined further above in the vehicle manager section is linearized along the reference state and input trajectory. The reference input $u_d$ is represented by the reference longitudinal and transverse forces in chassis corner coordinates, as explained above, and the reference state xd is calculated from the data provided by the vehicle manager, $$x_d = \begin{bmatrix} v_{xd} \\ v_{yd} \\ \omega_d \end{bmatrix} = \begin{bmatrix} v_d \cos d \\ v_d \sin\beta_d \\ \omega_d \end{bmatrix}$$

The result of the linearization are the following matrices and vectors $$A = \begin{bmatrix} -\dfrac{2k_x v_{xd}}{m} & \omega_d & v_{yd} \\ -\omega_d & 0 & -v_{xd} \\ 0 & 0 & 0 \end{bmatrix},$$

$$B = \begin{bmatrix} \dfrac{1}{m} & 0 & 0 \\ 0 & \dfrac{1}{m} & 0 \\ 0 & 0 & \dfrac{1}{J_z} \end{bmatrix} G,$$

$$C = \begin{bmatrix} \dfrac{xd}{\sqrt{v_{xd}^2 + v_{yd}^2}} & \dfrac{yd}{\sqrt{v_{xd}^2 + v_{yd}^2}} & 0 \\ -\dfrac{v_{yd}}{v_{xd}^2 + v_{yd}^2} & \dfrac{1}{v_{xd}^2 + v_{yd}^2} & 0 \\ 0 & 0 & 1 \end{bmatrix},$$

$$D = 0,$$

$$h_x = \begin{bmatrix} v_{yd}\omega_d - \dfrac{k_x}{m}v_{xd}^2 \\ -v_{xd}\omega_d \\ 0 \end{bmatrix} + Bu_d - Ax_d - Bu_d = \begin{bmatrix} -v_{yd}\omega_d + \dfrac{k_x}{m}v_{xd}^2 \\ v_{xd,0}\omega_d \\ 0 \end{bmatrix},$$

$$h_y = \begin{bmatrix} \sqrt{v_{xd}^2 + v_{yd}^2} \\ atan\dfrac{v_{yd}}{v_{xd}} \\ \omega_d \end{bmatrix} - Cx_d$$

The state x, the output y and the control action u of the chassis manager MPC consists of $$x = [v_x \ v_y \ \omega]^T, \ y = [v \beta \omega]^T$$

$$\mu = [F_{xd,fl,MPC} \ F_{yd,fl,MPC} \ldots F_{xd,rr,MPC} \ F_{yd,rr,MPC}]^T$$

Constraints which are described below can be defined for the state and the control action. The equality constraints of the MPC are the above system equations, the driving lock and a balance of the longitudinal corner forces of the chassis with the global force provided by the vehicle manager, i.e.

$$W_k = F_{xd} > C_{wk} = 0, \ D_{wk} = [1 \ 0 \ 1 \ 0 \ 1 \ 0 \ 1 \ 0], \ V_w = 1$$

The inequality constraints are given, as $u_{min}$, the absolute force limits Fmax at each wheel specified by the chassis observer and, as $u_{max}$, zero at the rear axle and the maximum propulsion force of the electric motor at the front axle. The rate limits are chosen to be symmetrical with $+/-100$ Nm at each sampling time. A polytope constraint approximates the friction circle at each wheel with octagons. The vertices of the octagon are calculated by $$\begin{bmatrix} P_{x,j} \\ P_{y,j} \end{bmatrix} = F_{max} \begin{bmatrix} \sin\left(2\pi\dfrac{j}{8}\right) \\ \cos\left(2\pi\dfrac{j}{8}\right) \end{bmatrix}, \ j = 1, \ldots, 8$$

The edges of the octagon can be described by linear functions and $p_m$ and pb can be derived from the corner points, i.e. the limit for wheel i is described by $$F_{xd,i,MPC} = P_{mj,i}F_{yd,i,MPC} + P_{bj,i}, \ j = 1, \ldots, 8, \ i = 1, \ldots$$

The control actions are restricted by the edges, but in principle can be controlled to any desired value within the polytope. This leads to the following inequality constraint, which is relaxed to ensure the viability of the optimization, $$H_{xj,i}F_{xd,i,MPC} + H_{yj,i}F_{yd,i,MPC} \leq H_{j,i} + V_{Hj,i}\varepsilon, \ j = 1, \ldots, 8,$$
$$i = 1, \ldots, 4$$

$$H_{xj,i} = \text{sign}(p_{bj,i}),$$

$$H_{yj,i} = -\text{sign}(p_{bj,i})p_{mj,i},$$

$$H_{j,i} = \text{sign}(p_{bj,i})P_{bj,i},$$

$$V_{Hj,i} = 1$$

The second type of polytope constraints is a stability envelope that restricts the yaw rate w and the rear slip angle $a_r$ in a stable driving range.

With the tire-road friction u, the gravitational constant g and the rear lateral tire stiffness Cr, the corners of the envelope are defined by $$\omega_{max} = \dfrac{\mu g}{v_d},$$

$$\alpha_{r,max} = 3\dfrac{F_{max,rl} + F_{max,rr}}{C_r}$$

The rear slip angle is a simple non-linear function of the output, but a more complicated function of the state. In order to derive a linear constraint, the non-linear function is approximated by linearization along the reference states. The result is an affine linear function of the state, with the details of the time-dependent coefficients being omitted here, $$\alpha_r = \beta - \dfrac{l_r}{v}\omega = \arctan\left(\dfrac{v_y}{v_x}\right) - \dfrac{l_r}{\sqrt{v_x^2 + v_y^2}}\omega \approx c_1 v_x + c_2 v_y + c_3 \omega + h_\alpha,$$

Applying the same method as for the friction circle, the envelope constraint is obtained as follows $$H_{1l}v_x + H_{2l}v_y + H_{3l}\omega \leq H_{0l} + C_{Hl}\varepsilon, \ l = 1, \ldots, 4,$$

$$H_{1l} = -\text{sign}(p_{bl})p_{ml}c_1,$$

$$H_{2l} = -\text{sign}(p_{bl})p_{ml}c_2,$$

$$H_{3l} = \text{sign}(p_{bl})(1 - p_{ml}c_3),$$

$$H_{0l} = \text{sign}(p_{bl})(P_{ml}h_a + P_{bl}),$$

$$V_{Hl} = 1$$

Collecting all the constraints in the overall matrices $H_{xk}$ and $H_{uk}$ and the vector $b_H$ introduced further above leads to the following results, with the trailing and leading zeros respectively corresponding to the non-zero block in the other matrix, $$H_{xk+1} = \begin{bmatrix} H_{11} & H_{21} & H_{31} \\ \vdots & \vdots & \vdots \\ H_{14} & H_{24} & H_{34} \\ 0 & 0 & 0 \\ \vdots & \vdots & \vdots \\ 0 & 0 & 0 \end{bmatrix},$$

-continued $$
H_{uk} =
\begin{bmatrix}
0 & 0 & 0 & 0 & 0 & 0 & 0 & 0 \\
\vdots & \vdots & \vdots & \vdots & \vdots & \vdots & \vdots & \vdots \\
0 & 0 & 0 & 0 & 0 & 0 & 0 & 0 \\
H_{x1,fl} & H_{y1,fl} \\
\vdots & \vdots \\
H_{x8,fl} & H_{y8,fl} \\
& & H_{x1,fr} & H_{y1,fr} \\
& & \vdots & \vdots \\
& & H_{x8,fr} & H_{y8,fr} \\
& & & & H_{x1,fl} & H_{y1,fl} \\
& & & & \vdots & \vdots \\
& & & & H_{x8,rl} & H_{y8,rl} \\
& & & & & & H_{x1,rr} & H_{y1,rr} \\
& & & & & & \vdots & \vdots \\
& & & & & & H_{x8,rr} & H_{y8,rr}
\end{bmatrix},
$$

$$
b_{Hk} =
\begin{bmatrix}
H_{01} \\
\vdots \\
H_{04} \\
H_{1,fl} \\
\vdots \\
H_{8,fl} \\
H_{1,fr} \\
\vdots \\
H_{8,fr} \\
H_{1,rl} \\
\vdots \\
H_{8,rl} \\
H_{1,rr} \\
\vdots \\
H_{8,rr}
\end{bmatrix}
$$

A comment on vehicle configurations other than those described here is appropriate at this point. In other configurations, the wheel is typically coupled to an axle by mechanical connections. The steering or the drivetrain are typical examples. If, for example, a vehicle with a single electric motor coupled to a differential at the front axle is considered, then additional equality constraints can replicate the coupling effects between the left and right wheels. Assuming a transmission ratio of 1, these couplings can be modeled with the equality constraints $$
\omega_m = \frac{1}{2}(\omega_{w,fl} + \omega_{w,fr}),
$$

$$
T_{w,fl} = \frac{1}{2}T_m,
$$

$$
T_{w,fr} = \frac{1}{2}T_m
$$

These constraints must be expressed with equivalent states or inputs, i.e. forces, by the vehicle and chassis observer, so that the generic equality constraint from further above can be applied.

The main task of the chassis observer is to provide estimates of the maximally allowable forces at each corner. The maximum forces Fmax are functions of the wheel load Fz and friction u, a tire parameter $k_{F_z}$ and the nominal wheel load $F_{z0} = mg/4$ according to $$
\begin{bmatrix}
F_{max,fl} \\
F_{max,fr} \\
F_{max,rl} \\
F_{max,rr}
\end{bmatrix}
=
\begin{bmatrix}
F_{z,fl}\mu_{fl}\left(1 + k_{Fz}\dfrac{F_{z0} - F_{z,fr}}{F_{z0}}\right) \\
F_{z,fr}\mu_{fr}\left(1 + k_{Fz}\dfrac{F_{z0} - F_{z,fr}}{F_{z0}}\right) \\
F_{z,fl}\mu_{fl}\left(1 + k_{Fz}\dfrac{F_{z0} - F_{z,rl}}{F_{z0}}\right) \\
F_{z,rr}\mu_{rr}\left(1 + k_{Fz}\dfrac{F_{z0} - F_{z,rr}}{F}\right)
\end{bmatrix}
$$

The vertical tire forces are estimated with a quasi-stationary model without suspension dynamics on the basis of the measured longitudinal and transverse acceleration by using the height h of the CoG according to the following model $$
\begin{bmatrix}
F_{z,fl} \\
F_{z,fr} \\
F_{z,rl} \\
F_{z,rr}
\end{bmatrix}
=
\begin{bmatrix}
\dfrac{m}{l}(l_r g - h a_x)\left(\dfrac{1}{2} - \dfrac{h}{2b_f g}a_y\right) \\
\dfrac{m}{l}(l_r g - h a_x)\left(\dfrac{1}{2} + \dfrac{h}{2b_f g}a_y\right) \\
\dfrac{m}{l}(l_f g - h a_x)\left(\dfrac{1}{2} - \dfrac{h}{2b_r g}a_y\right) \\
\dfrac{m}{l}(l_f g - h a_x)\left(\dfrac{1}{2} + \dfrac{h}{2b_r g}a_y\right)
\end{bmatrix}
$$

Ideally, the coefficient of friction between the tires and the road is known, for example by road condition observers. A conceptual solution based on connectivity is already available for this. Vehicles which are equipped with vehicle-to-infrastructure (V2I) connectivity publish their road condition data generated by on-board fusion of driving dynamics sensor data, camera data and other sensor data. The data subscribers are connected to the cloud-based road condition database eHorizon and benefit from frequently updated friction data. If the road conditions are not homogeneous, a rough estimate of the wheel-specific friction can be derived from the split detection of modern ABS and TCS.

The corner manager has three tasks: tracking the optimal horizontal forces provided by the chassis manager, maximizing the energy efficiency by optimized torque mixing between the electric motor and the friction brake and avoiding wheel locking or overspeed by slip control. The corner manager uses an inverse tire model to ascertain reference data for MPC-based optimization. Depending on the drive configuration, the references may be the wheel torque, slip, rotational speed and even steering angle references. A Pacejka tire model in vector form is used to calculate all of these reference data, although a reference rotational speed and a reference steering angle are not absolutely necessary in the motion control concept described here. Please note that in the following a single wheel is considered, and therefore all vectors have two components unless otherwise stated. The Pacejka model determines the wheel forces by using a known non-linear function with the slip vector s as input and with Fmax and the tire parameters B and C, $$
\begin{bmatrix} F_x \\ F_y \end{bmatrix} = F_{max}\sin(C\arctan(B|s|))\frac{1}{|s|}\begin{bmatrix} s_x \\ s_y \end{bmatrix},
$$

$$
|s| = \sqrt{s_x^2 + s_y^2}
$$

The inverse tire model, i.e. a determination of the longitudinal and transverse slip from the wheel forces, is given by 21                                                                22

$$\begin{bmatrix} s_x \\ s_y \end{bmatrix} = \frac{1}{B}\tan\left(\frac{1}{C}\arcsin\frac{|F|}{F_{max}}\right)\frac{1}{|F|}\begin{bmatrix} F_x \\ F_y \end{bmatrix},$$

$$|F| = \sqrt{F_x^2 + F_y^2}$$

To avoid dividing by zero, the tire models require a non-zero absolute slip or absolute force. In our application, we set the slip to zero if the absolute force is zero. It should be noted that the slip in the inverse tire model is only uniquely defined for F<Fmax.

By using the slip calculated from the inverse tire model, a steering angle at the wheel can be ascertained, presupposing that the wheel speeds are given and $v_{wx}$ is not zero, $$\delta = \arctan\left(\frac{s_y|v_w| + v_{wy}}{s_x|v_w| + v_{wx}}\right),$$

$$|v_w| = \sqrt{v_{wx}^2 + v_{wy}^2}$$

When stationary, the steering angle δ>0 from the previous step can be maintained and kept constant. In addition, if required, the wheel speed can be determined from $$\omega_w = \frac{1}{r_w}\sqrt{(s_x|v_w| + v_{wx})^2 + (s_y|v_w| + v_{wy})^2}.$$

It is worth mentioning that in all equations based on the inverse tire model, so far no coordinate system has been specified, i.e. the coordinates can be specified either in the chassis corner system or in the wheel corner system. In order to decide on the most suitable coordinates, it is helpful to look closer at the wheel vectors, see FIG. 5.

Figure 5:
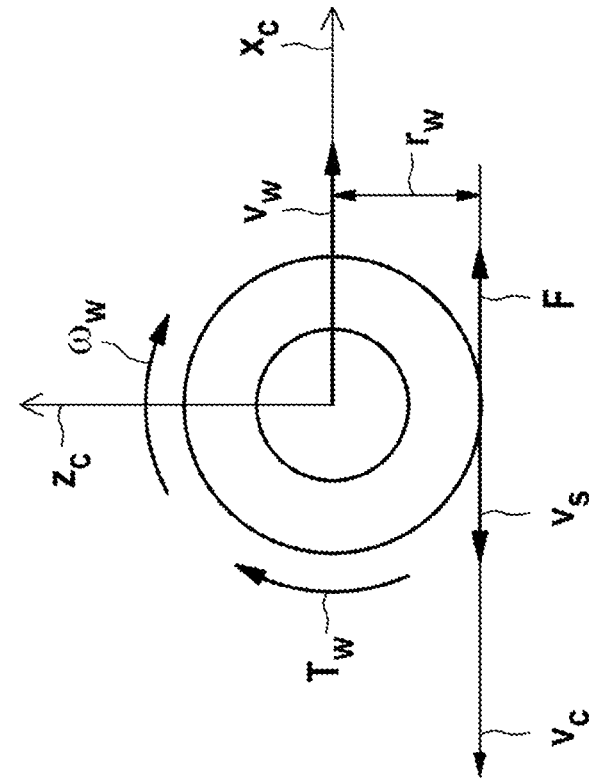
FIG. 5 shows the forces on a tire.
Figure 5:
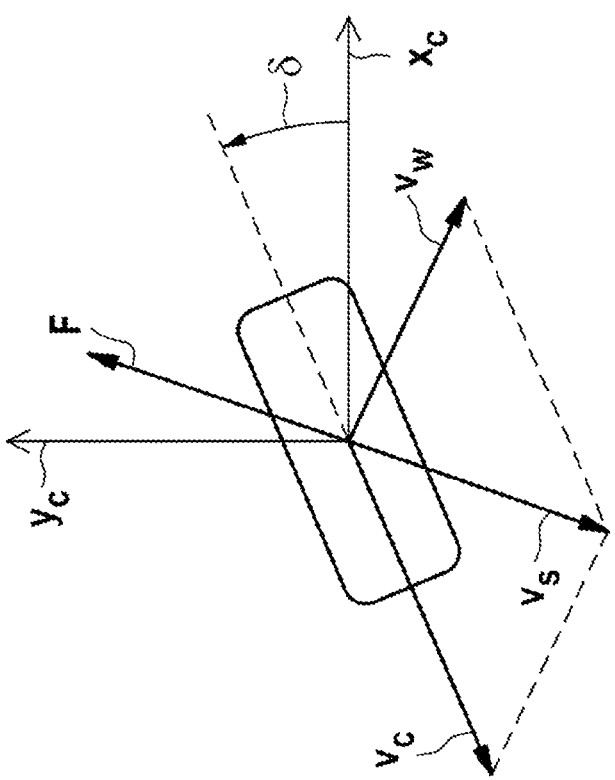

FIG. 5 shows a moving wheel in a cornering situation. The rotation of the wheel with the speed ww produces a circumferential speed vc, which is given in the chassis corner system as $$v_c^c = -\omega_w r_w \begin{bmatrix} \cos \\ \sin\delta \end{bmatrix}.$$

The vector sum of the circumferential speed and the translational speed result in the so-called slip speed or sliding speed Vs. It is assumed that the corner force always points in the opposite direction to the sliding speed. The wheel slip is then only the sliding speed normalized with the absolute wheel speed, i.e.

$$s = \begin{bmatrix} s_x \\ s_y \end{bmatrix} = -\frac{1}{|v_w|}v_s = -\frac{1}{|v_w|}(v_c + v_w)$$

The slip is expressed differently in the respective chassis or wheel corner systems, as can be seen from the following variants $$s^c = \frac{1}{|v_w|}\begin{bmatrix} -\omega_w r_w\cos\delta + v_{wx} \\ -\omega_w r_w\sin\delta + v_w^c \end{bmatrix},$$

$$s^w = \frac{1}{|v_w|}\begin{bmatrix} -\omega_w r_w + v_{wx}^w \\ v_{wy}^w \end{bmatrix}.$$

In the following the wheel-corner-based description of the slip is used. For the slip control, a model of the slip dynamics is derived from a quarter-car model, which describes the wheel rotation dynamics with the wheel rotation speed and the quarter-car translation dynamics with the longitudinal wheel speed $V_{wx}$. The input into the quarter-car model is the wheel torque Tw. The required parameters are the wheel moment of inertia $J_w$, the quarter-car mass $m_q$=m/4 and the wheel radius $r_w$. The tire force $F_x$ couples the translational and rotational parts together. The model is simplified because all resistances are ignored. The quarter-car model is non-linear because, as seen above, the longitudinal force is a non-linear function of the slip. The state space form of the quarter-car model is given by $$\begin{bmatrix} \dot{v}_{wx} \\ \dot{\omega}_w \end{bmatrix} = \begin{bmatrix} \frac{1}{m_q}F_x(s_x) \\ -\frac{r_w}{J_w}F_x(s_x) \end{bmatrix} + \begin{bmatrix} 0 \\ \frac{1}{J_w} \end{bmatrix}T_w$$

The prediction model of the longitudinal slip is obtained as a result of differentiating the longitudinal slip over time and using the accelerations from the quarter-car model, with the upper index w of the coordinate system having been omitted and the lateral wheel speed assumed to be zero, $$s_x = \frac{\omega_w r_w - v_{wx}}{|v_w|},$$

$$\dot{s}_x \approx \frac{r_w}{v_{wx}}\dot{\omega}_w - \frac{\omega_w r_w}{v_{wx}^2}\dot{v}_{wx} = -\frac{1}{v_{wx}}\left(\frac{r_w^2}{J_w} + \frac{\omega_w r_w}{v_{wx}m_q}\right)F_x(s_x) + \frac{r_w}{J_w v_{wx}}T_w$$

The slip model can be further simplified by ignoring the angular velocity term and linearly approximating the longitudinal force $F_x$, i.e. with $$\frac{\omega_w r_w}{v_{wx}m_q} \ll \frac{r_w^2}{J_w},$$

$$F_x(s_x) \approx k_{Fx}s_x,$$

$$k_{Fx} = \begin{cases} \frac{F_{max}}{|s_{x,thr}|}, & |s_x| < |s_{x,thr}| \\ \frac{F_{max}}{|s_x|}, & |s_x| \geq |s_{x,thr}| \end{cases}$$

The slip threshold $S_{x,thr}$ is either given individually for the traction and braking control or may be calculated from the above inverse tire model. It should be noted that the force approximation is absolute and does not describe a deviation from the operating point. The result of these simplifications is a linear time-variant slip model in state space form $$x_s = s_x,$$

$$u_s = T_w,$$

$$y_s = s_x,$$

$$A_s = -\frac{r_w^2 k_{Fx}}{J_w v_{wx}},$$

$$B_s = \frac{r_w}{J_w v_{wx}},$$

$$C_s = 1,$$

$$D_s = 0,$$

The corner manager is also responsible for the torque distribution between the electric motor and the friction brake. This task of the dynamic control assignment is undertaken by the corner MPC. For each wheel there is a corner manager, which requires the current measurement of the electric motor torque $T_m$, the friction braking torque $T_b$ and the longitudinal wheel slip $s_x$. The engine and brake actuators are modeled by simple first-order dynamics with the time constant $T_1$. The output of the actuator model is the sum of the engine and braking torque, i.e. the wheel torque $T_w$. The state space model of the actuators is linearly time-invariant and given by $$x_a = \begin{bmatrix} T_m \\ T_b \end{bmatrix}$$

$$u_a = \begin{bmatrix} T_{md,MPC} \\ T_{bd,MPC} \end{bmatrix}$$

$$y_a = T_w$$

$$A_a = \begin{bmatrix} -\frac{1}{T_{1m}} & 0 \\ 0 & -\frac{1}{T_{1b}} \end{bmatrix},$$

$$B_a = \begin{bmatrix} \frac{1}{T_{1m}} & 0 \\ 0 & \frac{1}{T_{1b}} \end{bmatrix},$$

$$C_a = [1 \quad 1]$$

$$D_a = 0$$

The models of the actuators and the slip are discretized by the Tustin method and then combined into the discrete overall corner model used in the MPC $$x_k = \begin{bmatrix} x_a \\ x_s \end{bmatrix},$$

$$u_k = u_a,$$

$$y_k = \begin{bmatrix} y_a \\ y_s \end{bmatrix} = \begin{bmatrix} T_w \\ s_x \end{bmatrix},$$

$$A_k = \begin{bmatrix} A_{ak} & 0 \\ B_{sk}C_{ak} & A_{sk} \end{bmatrix},$$

$$B_k = \begin{bmatrix} B_{ak} \\ B_{sk}D_{ak} \end{bmatrix},$$

$$C_k = \begin{bmatrix} C_{ak} & 0 \\ D_{sk}C_{ak} & C_{sk} \end{bmatrix},$$

$$D_k = \begin{bmatrix} D_{ak} \\ D_{sk}D_{ak} \end{bmatrix}$$

The reference values for the MPC optimization are obtained from the reference corner forces in chassis coordinates, $$y_{dk} = \begin{bmatrix} T_{wd} \\ s_{xd} \end{bmatrix} = \begin{bmatrix} r_w(F_{xd}^c \cos\delta + F_{xd}^c \sin\delta) \\ s_{xd} \end{bmatrix},$$

$$u_{dk} = \begin{bmatrix} T_{md} \\ T_{bd} \end{bmatrix} = \begin{bmatrix} T_{wd} \\ 0 \end{bmatrix}$$

In order to optimize the energy efficiency, the electric motor is the preferred actuator over the friction brake. Unlike in the case of the chassis manager, the static curve control assignment for providing reference control actions in the case of the corner manager is as it were a rule-based allocation without the need for a pseudo-inverse.

Equality constraints of the MPC of the curve manager are the state dynamics and a torque sum constraint, which compares the control action with the setpoint wheel torque, $$W_k = T_{wd}, \ C_{wk} = 0, \ D_{wk} = [1 \ 1], \ V_w = 1$$

The inequality constraints are the upper and lower limits of the electric motor and the friction brake. Other constraints are not taken into account.

The task of the curve observer is to provide the actual wheel slip data in the longitudinal direction. The translational speeds at each wheel must be determined for this. By transforming the measured vehicle state with the transformation matrices defined in the chassis manager section, the eight speeds in the wheel corner coordinate systems are given as $$v_w^w = T^{wc} G^T [v_x \quad v_y \quad \omega]^T$$

A further task of the curve observer is to monitor the temperature of the friction brake disk. A model of the temperature profile is used for this.

The temperature model includes the lining surface temperature $\xi_1$ and the disk temperature $\xi_2$ as state variables. The input of the model is the friction braking power Pb and the ambient air temperature $\xi_u$. The output is the brake disk temperature $\xi_2$. The parameters of the model are the heat capacities $C_{b1}$, $C_{b2}$, the thermal conductivity value Ab and the convection ab. The state space form of the temperature model is $$\begin{bmatrix} \dot{\vartheta}_1 \\ \dot{\vartheta}_2 \end{bmatrix} = \begin{bmatrix} -\frac{\lambda_b}{c_{b1}} & \frac{\lambda_b}{c_{b1}} \\ \frac{\lambda_b}{c} & -\frac{\lambda_b + \alpha_b}{c} \end{bmatrix} \begin{bmatrix} \vartheta_1 \\ \vartheta_2 \end{bmatrix} + \begin{bmatrix} \frac{1}{c_{b1}} & 0 \\ 0 & \frac{\alpha_b}{c_{b2}} \end{bmatrix} \begin{bmatrix} P_b \\ \vartheta_u \end{bmatrix}$$

$$\vartheta_2 = [0 \quad 1] \begin{bmatrix} \vartheta_1 \\ \vartheta_2 \end{bmatrix}$$

The temperature model is used to monitor the disk temperature and to initiate an alarm event if the temperature exceeds a certain threshold. If the event occurs, the vehicle speed must be reduced to no more than 30 km/h. A PID speed controller designed by the so-called Model Free Control (MFC) method is used for this purpose. The speed controller overrides the driver's acceleration requirement. The temperature model is linear and can therefore potentially be integrated into the corner manager MPC together with the disk temperature constraints. It is worth mentioning that restricting the waste heat at the friction brake is accompanied by a reduction in the particulate emissions from the brake.

The simulation results show the validity of the motion control concept, which is explained and illustrated on the basis of the required and actual driving dynamics data. For each of the high-level motion control objectives specified further above, a representative maneuver is selected to assess the feasibility and performance of the proposed control concept. In all simulations, the sampling time of the chassis MPC is Ts=10 ms and the forecast and control horizons are N=4 and M=2. The sampling times of the curve MPC are 2 ms and the horizon lengths are identical to the chassis MPC.

Figure 6:
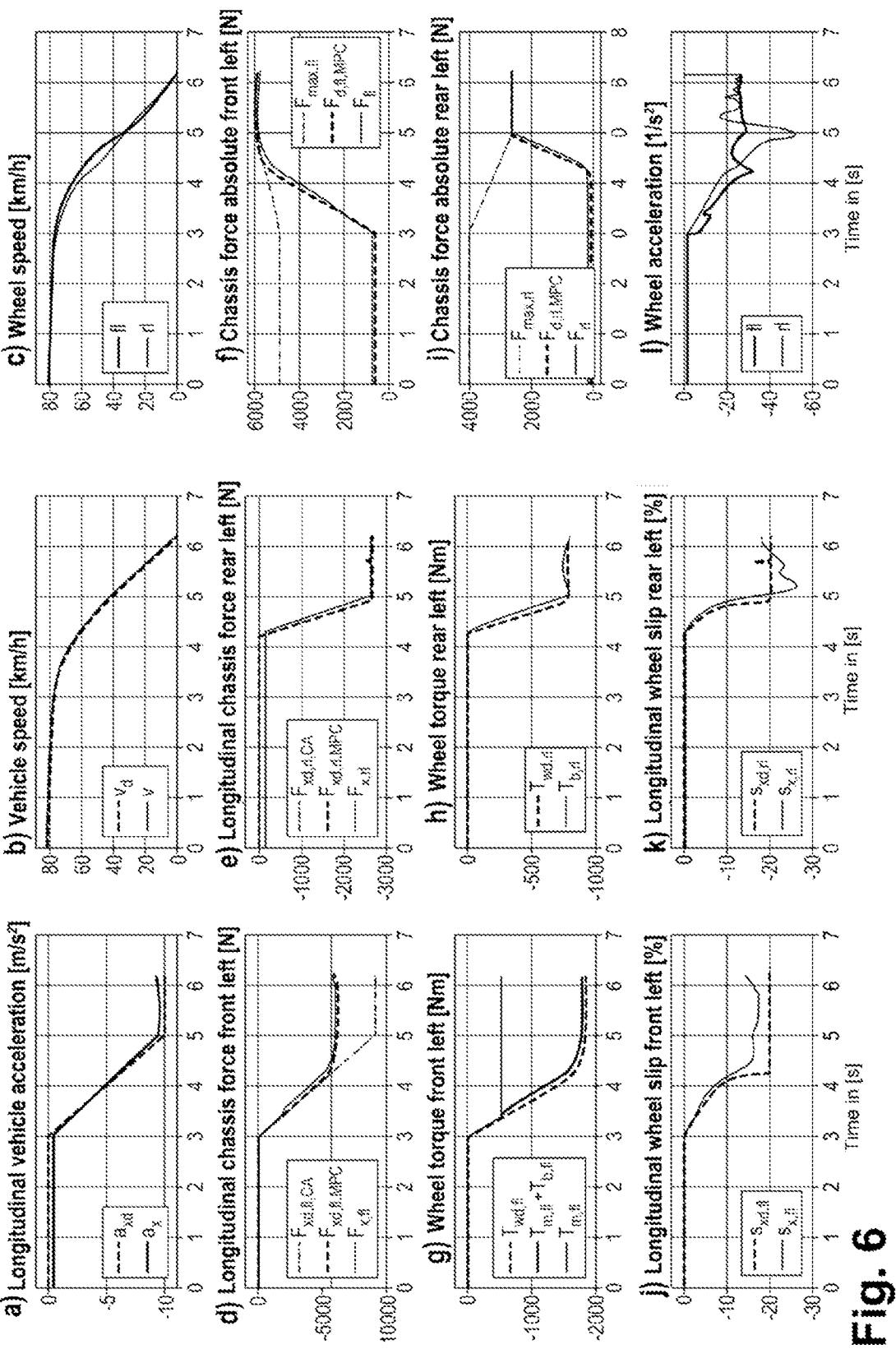
FIG. 6 shows a first test maneuver.

The first maneuver, which is shown in the diagrams of FIG. 6, is a straight-ahead braking attempt, to visualize the front-to-rear torque vectoring by the chassis manager MPC and a braking torque overlay by the two corner MPCs at the front axle. In the last phase of the maneuver, the two rear corner MPCs carry out slip control in order to avoid locking of the wheels.

FIG. 6 shows a simulation of a straight-ahead braking maneuver with energy prioritization, d) and e) torque vectorizing between the front and rear axles, g) torque blending at the front axle with a maximum braking torque limit of −500 Nm, assumed to be constant, k) slip control at the rear axle.

Figure 7:
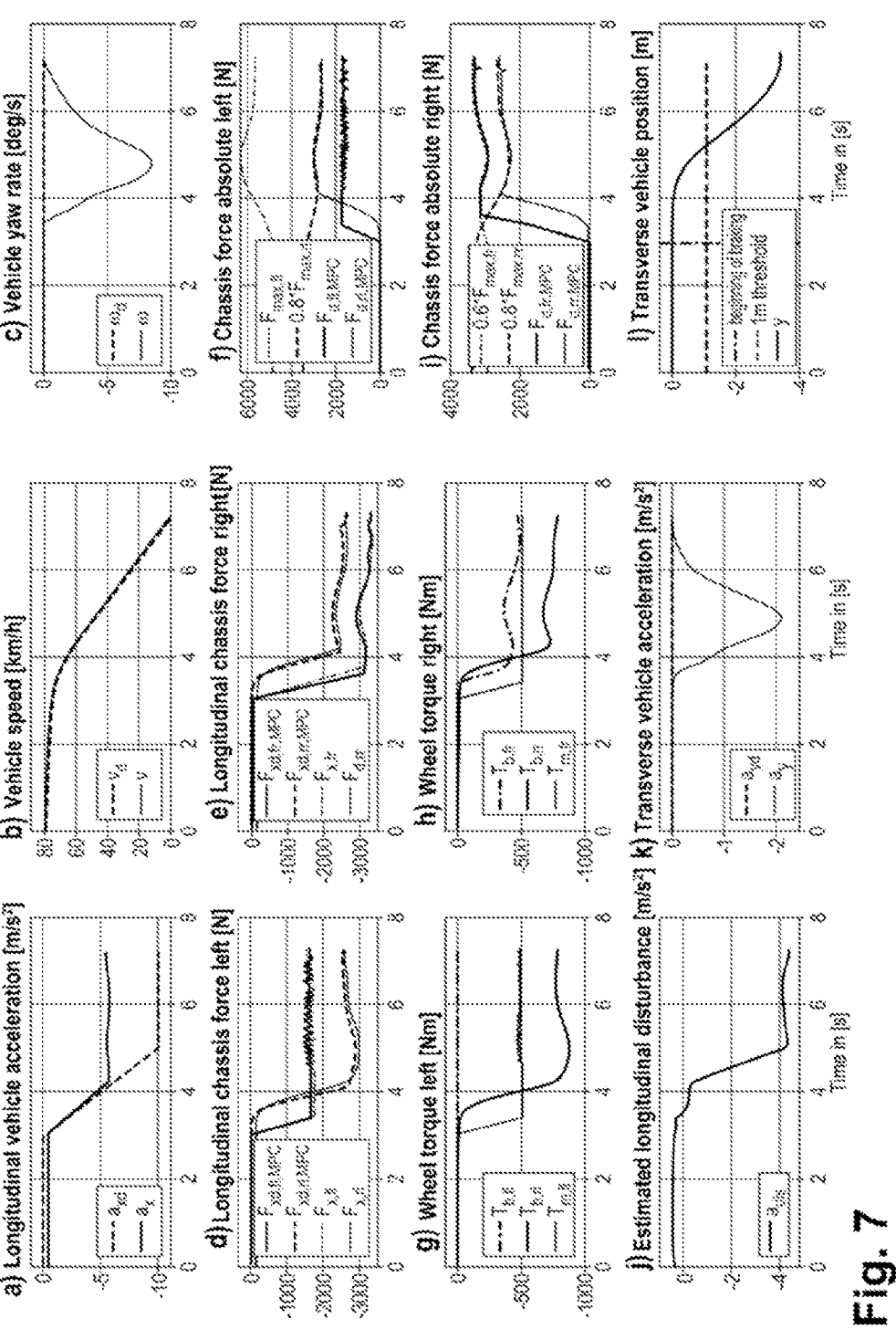
FIG. 7 shows a second test maneuver.

The second test case is the same as before, but with a failure of the front left friction brake actuator, see FIG. 7. This situation would produce a disturbing yaw moment, leading to immediate uncontrolled wheel-spinning of the vehicle. With the motion control, the driver can take control of the situation at any time. The strategy is to reduce the maximum force limits on the remaining healthy curves in order to ensure stability. The level of the reduction was ascertained empirically. With this simple measure, the chassis MPC is capable of redistributing the braking forces in such a way that the disturbing yaw moment is counteracted and at the same time the driver's braking requirement is met, albeit at a lower level than in the error-free case.

FIG. 7 shows a simulation of an actuator failure, g) failure of the front left friction brake, f) and i) vehicle stability ensured by reducing the maximum force applications on the rear axle by 80% and on the right front wheel by 60%, b) and j) loss of the deceleration taken into account in the reference speed by disturbance estimation, l) the driver can take control over the path deviation.

Figure 8:
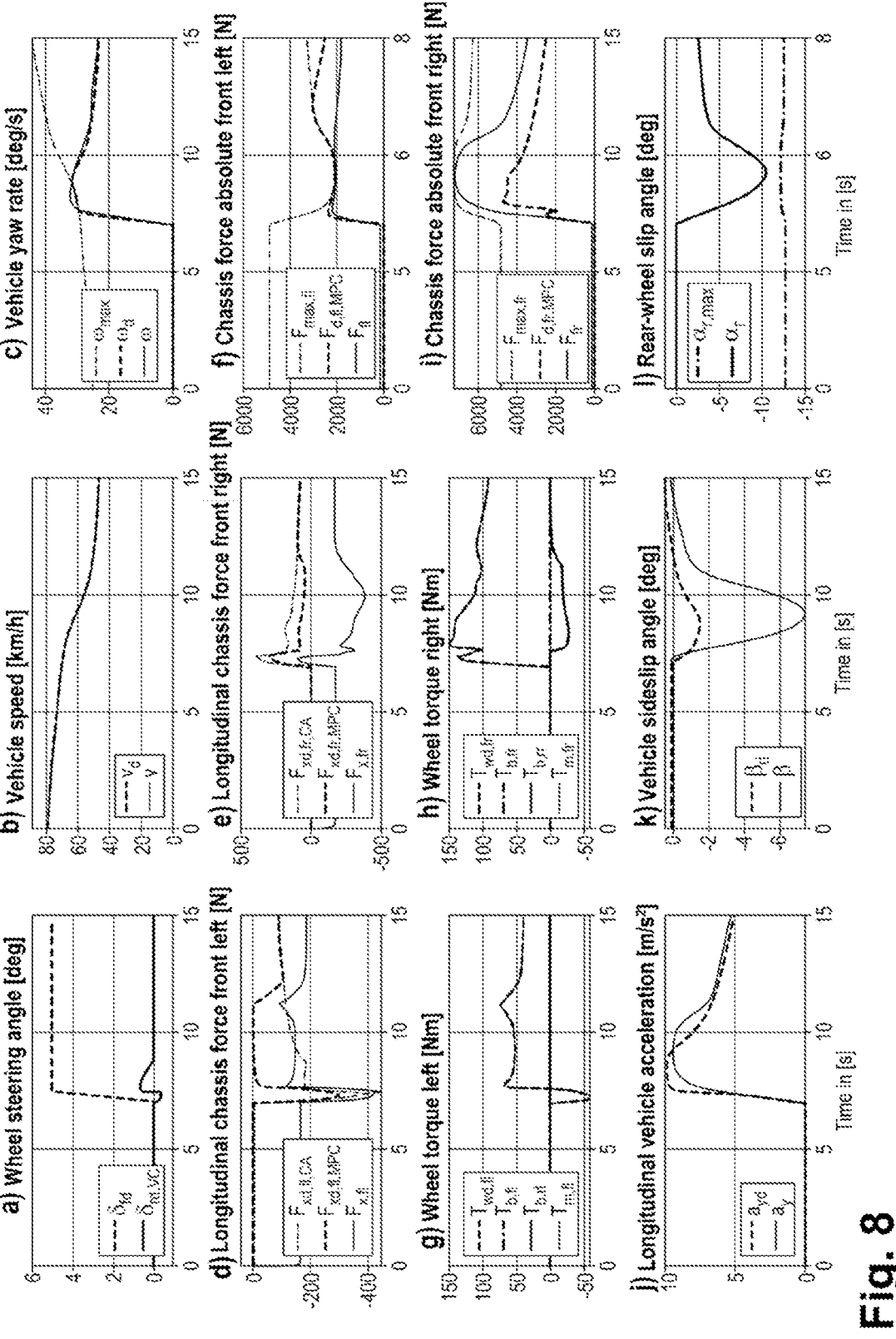
FIG. 8 shows a third test maneuver.

The final test case is a brisk incremental steering maneuver, which illustrates the ability of the lateral torque vectoring to improve the agility while at the same time maintaining stability, see FIG. 8. In the first phase, the chassis MPC assigns a negative force to the inside front wheel and a positive force to the outside wheel. The high-speed electric motors follow the requirements quickly and the yaw-rate tracking is quite impressive. In the following phase, the inner front wheel force reaches saturation and with it so does the yaw rate, so that the chassis MPC reduces the required force correspondingly. At the same time, the chassis MPC assigns a small part of the braking force to the right rear outside corner to ensure stability. The amount of the speed reduction during cornering is very small on account of the torque vectoring capabilities of the electric motors.

FIG. 8 shows a simulation of an incremental steering maneuver with agilization and stabilization, d) and e) torque vectorization on the front axle between left and right and on the right side between front and rear.

The invention claimed is:

1. A method for controlling actuators acting on vehicle wheels of a motor vehicle comprising:

ascertaining a force to be brought about on a reference point of the motor vehicle on the basis of driver specifications, ascertaining wheel forces to be brought about on the vehicle wheels to implement the force to be brought about on the reference point of the motor vehicle with a first dynamic allocation by model-based predictive control;

ascertaining setpoint values for wheel parameters from the wheel forces;

actuating the actuators of the motor vehicle so as to implement the setpoint values of the wheel parameters; and converting the wheel forces with an inverse tire-force model into setpoint variables for torques, wheel slips, rotational speeds and steering angles of the wheels.

2. The method as claimed in claim 1, wherein the driver specifications are made available by at least one of a virtual driver and an assistance system.

3. The method as claimed in claim 1, wherein the driver specifications are at least one of an acceleration and at least one steering angle.

4. The method as claimed in claim 1, wherein the setpoint values for the wheel parameters are at least one of torques respectively acting on the wheels, slip values of the wheels, rotational speeds of the wheels, and steering angles of the wheels.

5. The method as claimed in claim 1, wherein implementing a setpoint value for a torque acting on a vehicle wheel further comprises a second dynamic allocation, which includes slip control.

6. The method as claimed claim 1, wherein the actuators are at least one of electric motors and friction brakes.

7. The method as claimed in claim 1, further comprising adapting kinematic setpoint motion variables by way of a virtually controlled single-track model which are taken into account in the first dynamic allocation of the wheel forces.

8. The method as claimed in claim 1, wherein the dynamic allocation of the wheel forces includes driving dynamics control.

9. The method as claimed in claim 1, wherein ascertaining the wheel forces further comprises ascertaining the wheel forces from a static allocation and feeding the wheel forces to the dynamic allocation as input values.

10. The method as claimed in claim 9, further comprising arbitrating from the ascertained wheels forces of the static and the dynamic allocation.

11. The method as claimed in claim 1, wherein the first dynamic allocation comprises a saturation of an assigned actuator, a reconfiguration to ensure the error tolerance in the event of failure of the actuator, an increase in the energy efficiency and a minimization of wear.

* * * * *